US010742286B2

(12) United States Patent
Aryafar et al.

(10) Patent No.: US 10,742,286 B2
(45) Date of Patent: Aug. 11, 2020

(54) RESOURCE ALLOCATION TECHNIQUES FOR BEAMFORMING TRAINING

(71) Applicant: INTEL CORPORATION, Santa Clara, CA (US)

(72) Inventors: Ehsan Aryafar, Santa Clara, CA (US); Carlos Cordeiro, Portland, OR (US); Sarabjot Singh, Santa Clara, CA (US); Jing Zhu, Portland, OR (US); Wook Bong Lee, Pleasanton, CA (US); Nageen Himayat, Fremont, CA (US); Alexander Sirotkin, Petach Tikva (IL); Candy Yiu, Portland, OR (US); Umesh Phuyal, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/164,604

(22) Filed: Oct. 18, 2018

(65) Prior Publication Data

US 2019/0288756 A1 Sep. 19, 2019

Related U.S. Application Data

(63) Continuation of application No. 15/394,509, filed on Dec. 29, 2016, now Pat. No. 10,164,697.

(51) Int. Cl.

| | |
|---|---|
| ***H04B 7/06*** | (2006.01) |
| ***H04W 72/04*** | (2009.01) |
| ***H04W 40/24*** | (2009.01) |
| *H04B 1/7143* | (2011.01) |

(52) U.S. Cl.

CPC ........ *H04B 7/0617* (2013.01); *H04W 40/244* (2013.01); *H04W 72/046* (2013.01); *H04W 72/048* (2013.01); *H04B 1/7143* (2013.01); *H04W 72/0453* (2013.01); *H04W 72/0493* (2013.01)

(58) Field of Classification Search

CPC .. H04B 7/0684; H04B 7/0617; H04W 76/023
See application file for complete search history.

(56) References Cited

U.S. PATENT DOCUMENTS

| | | | | |
|---|---|---|---|---|
| 2010/0303024 A1* | 12/2010 | Gossain | H04W 72/04 370/329 |
| 2014/0328264 A1* | 11/2014 | Merlin | H04W 74/04 370/329 |
| 2015/0085777 A1* | 3/2015 | Seok | H04W 52/0216 370/329 |
| 2017/0111099 A1* | 4/2017 | Jo | H04B 7/0684 |
| 2017/0302349 A1* | 10/2017 | Sun | H04W 76/10 |
| 2017/0353984 A1* | 12/2017 | Abdallah | H04B 7/0617 |

* cited by examiner

*Primary Examiner* — Myron Wyche

(57) ABSTRACT

Various embodiments may be generally directed to resource allocation techniques for beam forming training. In one embodiment, for example, an apparatus may comprise logic for an access point (AP), at least a portion of the logic implemented in circuitry coupled to the memory, the logic to identify one or more resources available to support beamforming operations in a time interval, enable the AP to use the one or more resources in the time interval to interact with one or more allowed classes of station (STA) to perform one or more beamforming operations, and generate a frame for wireless transmission comprising a set of indicator bits encoded with an indication of the one or more resources. Other embodiments are described and claimed.

32 Claims, 14 Drawing Sheets

100

100

300

400

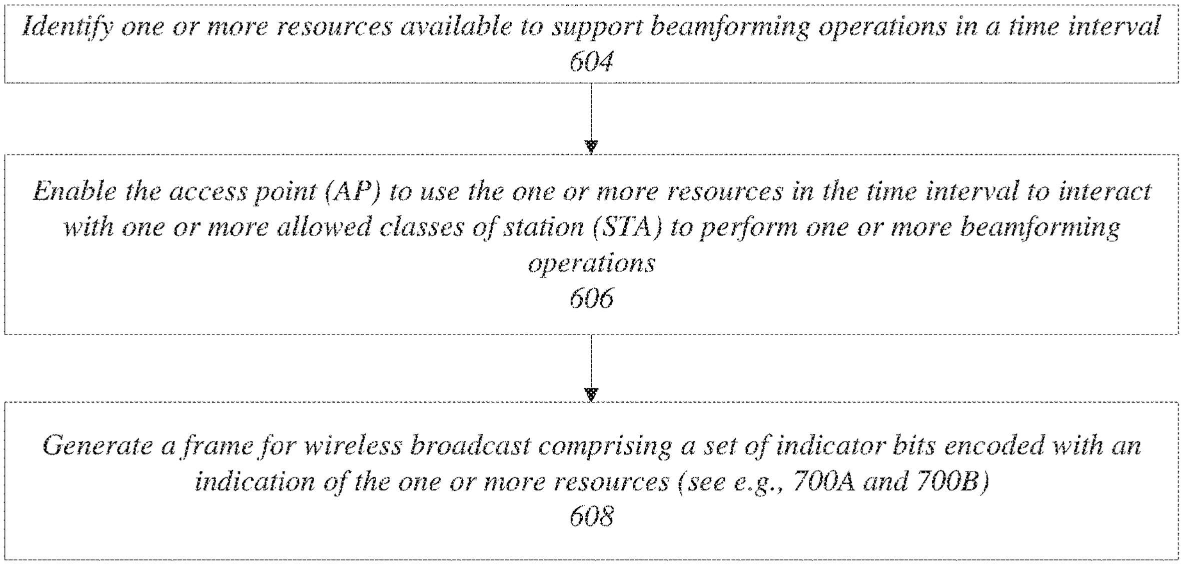

Identify one or more resources available to support beamforming operations in a time interval
604

Enable the access point (AP) to use the one or more resources in the time interval to interact with one or more allowed classes of station (STA) to perform one or more beamforming operations
606

Generate a frame for wireless broadcast comprising a set of indicator bits encoded with an indication of the one or more resources (see e.g., 700A and 700B)
608

700A

700B

800A

Storage Medium 900

*Computer Executable Instructions for 600*

*Computer Executable Instructions for 700A*

*Computer Executable Instructions for 700B*

*Computer Executable Instructions for 800A*

*Computer Executable Instructions for 800B*

RESOURCE ALLOCATION TECHNIQUES FOR BEAMFORMING TRAINING

CROSS-REFERENCE TO RELATED APPLICATION

This application is a continuation of, claims the benefit of and priority to previously filed U.S. patent application Ser. No. 15/394,509 filed Dec. 29, 2016, entitled "RESOURCE ALLOCATION TECHNIQUES FOR BEAMFORMING TRAINING", which is hereby incorporated by reference in its entirety.

BACKGROUND

The 60 GHz wireless communication frequency band offers substantial promise for use in accommodating the ever-growing data-rate demands of wireless communications devices and their users. The 60 GHz band contains a large amount of available bandwidth, the physical properties of signals with frequencies in the 60 GHz band render them well-suited for use in directional transmission and reception in conjunction with the application of spatial multiplexing techniques. When two 60 GHz-capable devices initially establish a connection with each other, they may perform a beamforming training procedure in order to identify the respective directions in which they should transmit and the respective directions from which they should receive. In many typical scenarios in which there is an unobstructed direct path between the two 60 GHz-capable devices, each device's optimal transmit direction may be the same as its optimal receive direction—namely the direction of the unobstructed path to the other device. In some cases, however, the device's optimal transmit directions may differ from their optimal receive directions.

BRIEF DESCRIPTION OF THE DRAWINGS

FIG. 6 illustrates an embodiment of a first logic flow.

DETAILED DESCRIPTION

Figure 1:
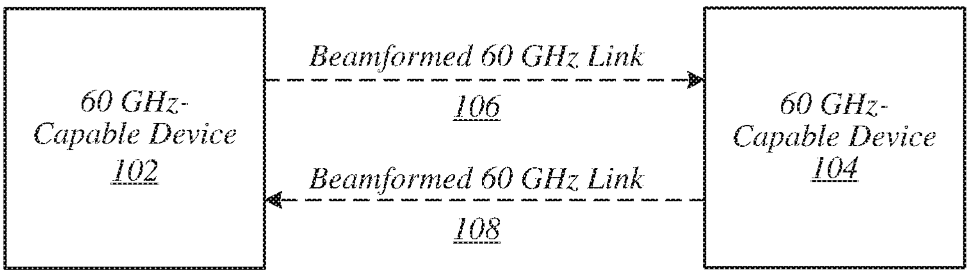
FIG. 1 illustrates an embodiment of a first operating environment.

Various embodiments may be generally directed to resource allocation techniques for beam forming training. In one embodiment, for example, an apparatus may comprise logic for an access point (AP), at least a portion of the logic implemented in circuitry coupled to the memory, the logic to identify one or more resources available to support beamforming operations in a time interval, enable the AP to use the one or more resources in the time interval to interact with one or more allowed classes of station (STA) to perform one or more beamforming operations, and generate a frame for wireless transmission comprising a set of indicator bits encoded with an indication of the one or more resources. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 60 GHz frequencies. Various such embodiments may involve wireless communications performed according to one or more standards for 60 GHz wireless communications. For example, some embodiments may involve wireless communications performed according to one or more Wireless Gigabit Alliance ("WiGig")/Institute of Electrical and Electronics Engineers (IEEE) 802.11ad/ay standards, such as IEEE 802.11ad-2012, including their predecessors, revisions, progeny, and/or variants. Various embodiments may involve wireless communications performed according to one or more "next-generation" 60 GHz ("NG60") wireless local area network (WLAN) communications standards. Some embodiments may involve wireless communications performed according to one or more millimeter-wave (mmWave) wireless communication standards. It is worthy of note that the term "60 GHz," as it is employed in reference to various wireless communications devices, wireless communications frequencies, and wireless communications standards herein, is not intended to specifically denote a frequency of exactly 60 GHz, but rather is intended to generally refer to frequencies in, or near, the 57 GHz to 64 GHz frequency band or any nearby unlicensed band. The embodiments are not limited in this context.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group and/or IEEE 802.11 Task Group (TG) ax, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100 that may be representative of various embodiments. In operating environment 100, 60 GHz-capable devices 102 and 104 communicate with each other over beamformed 60 GHz links 106 and 108. 60 GHz-capable device 102 sends data to 60 GHz-capable device 104 over beamformed 60 GHz link 106, and receives data from 60 GHz-capable device 104 via beamformed 60 GHz link 108. Likewise, 60 GHz-capable device 104 sends data to 60 GHz-capable device 102 over beamformed 60 GHz link 108, and receives data from 60 GHz-capable device 102 via beamformed 60 GHz link 106. In some embodiments, 60 GHz-capable devices 102 and 104 may comprise wireless communication devices in a wireless network that utilizes wireless channel frequencies of the 60 GHz band. In various embodiments, 60 GHz-capable devices 102 and 104 may communicate with each other according to one or more standards for 60 GHz wireless communications. For example, in some embodiments, 60 GHz-capable devices 102 and 104 may communicate with each other according to one or more protocols and/or procedures defined in IEEE 802.11ad/ay-2012, and/or its predecessors, revisions, progeny, and/or variants. In various such embodiments, 60 GHz-capable devices 102 and 104 may comprise 60 GHz-capable stations (STAs) such as Directional Multi-Gigabit (DMG) stations (STAs). In some such embodiments, one of 60 GHz-capable devices 102 and 104 may operate as a personal basic service set (PBSS) control point/access point (PCP/AP). The embodiments are not limited to these examples.

In some embodiments, 60 GHz-capable devices 102 and 104 may possess directional transmission and reception capabilities, and the exchange of data over beamformed 60 GHz links 106 and 108 may involve directional transmission and reception of signals. In various embodiments, each directional transmission may be directed towards a selected one of a plurality of transmit (TX) sectors of the transmitting device. In some embodiments, each directional reception may be performed by focusing a receive beam of the receiving device towards a selected one of a plurality of receive (RX) sectors of the receiving device. In various embodiments, 60 GHz-capable device 102 may send data over beamformed 60 GHz link 106 by transmitting signals comprising that data towards a selected TX sector. In some embodiments, 60 GHz-capable device 104 may receive data over beamformed 60 GHz link 106 by receiving signals comprising that data while focusing its receive beam towards a selected RX sector. In various embodiments, 60 GHz-capable device 104 may send data over beamformed 60 GHz link 108 by transmitting signals comprising that data towards a selected TX sector. In some embodiments, 60 GHz-capable device 102 may receive data over beamformed 60 GHz link 108 by receiving signals comprising that data while focusing its receive beam towards a selected RX sector. The embodiments are not limited in this context.

In various embodiments, the quality with which one of 60 GHz-capable devices 102 and 104 receives a signal transmitted by the other may depend greatly on the TX sector used to transmit the signal and the RX sector used to receive the signal. If a TX sector is selected that results in the signal reaching the receiver with a high level of quality, and an RX sector is selected such that the receiver's receive beam is oriented towards the incoming signal, the receiver may receive the signal with a high level of quality, resulting in a high link quality with respect to the associated beamformed 60 GHz link. On the other hand, if a TX sector is selected that results in the signal reaching the receiver with a low level of quality, and/or an RX sector is selected such that the receiver's receive beam is oriented away from the incoming signal, the receiver may receive the signal with a low level of quality, resulting in a low link quality with respect to the associated beamformed 60 GHz link. In some embodiments, in order to select TX and RX sectors to optimize link qualities of beamformed 60 GHz links 106 and 108, 60 GHz-capable devices 102 and 104 may perform a beamforming training procedure. The device that initiates such a beamforming training procedure may be referred to as the "initiator," and the other participating device may be referred to as the "responder."

Figure 2A:
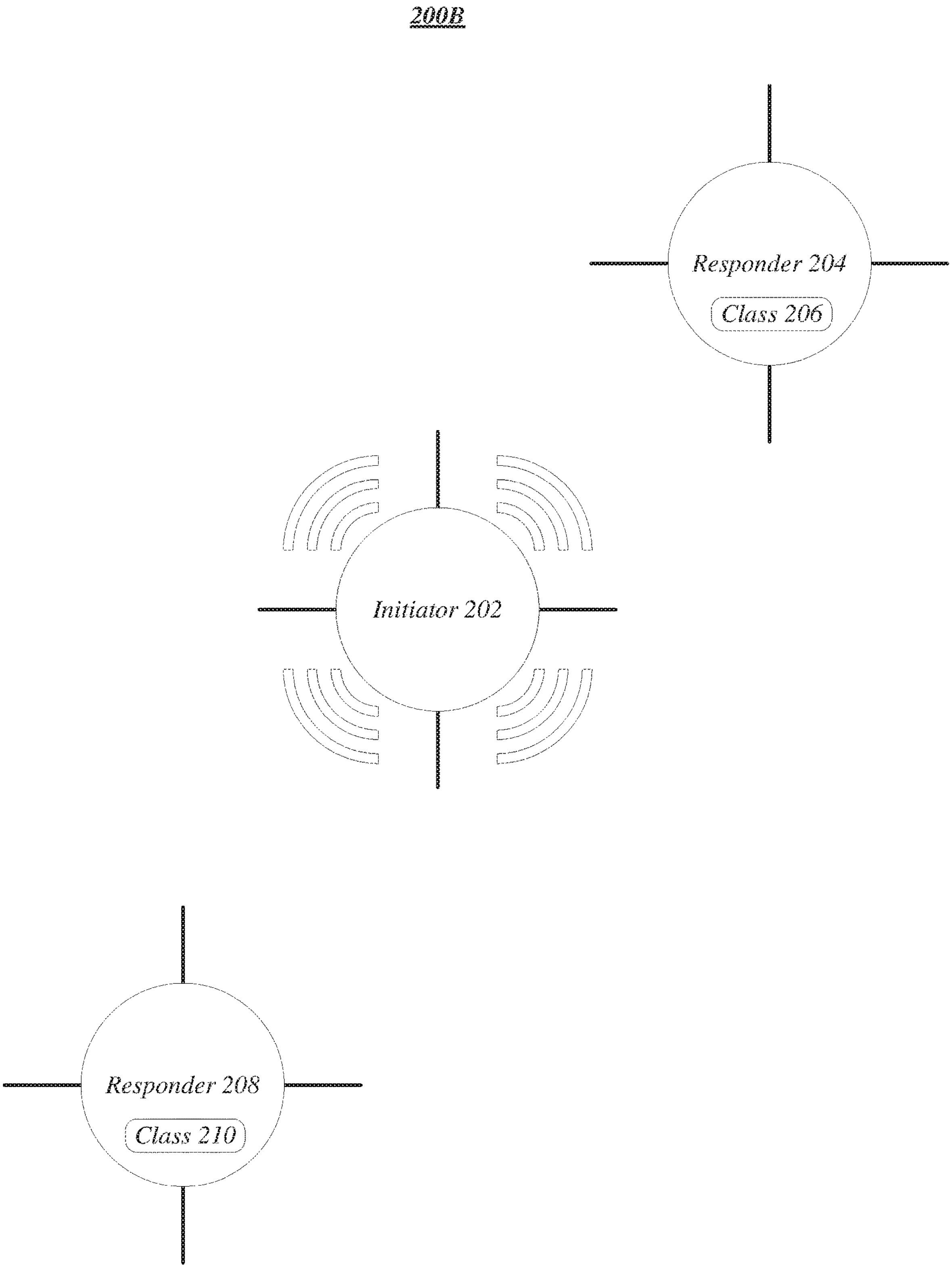
FIG. 2A illustrates an embodiment of a second operating environment.

FIG. 2A illustrates an example of an operating environment 200A that may be representative of beamforming operations initiator 202 may perform in various embodiments to establish a wireless link with one or more responders (e.g., responders 204 and 208). In operating environment 200A, initiator 202 may broadcast one or more wireless signals to any potential responders within range. In various embodiments, the wireless transmission may announce a wireless network and/or initiate beamforming operations. For instance, the wireless transmission may include a plurality of frames transmitted during a sector sweep, such as during a beacon transmission interval (BTI) (see e.g., beacon frame sweep 320 of FIG. 3). In the illustrated embodiment, responders 204 and 208 may be associated with respective classes 206 and 210 and may receive one or more portions of the wireless transmission from initiator 202. In various embodiments described herein, the wireless transmission may include an indication of resources that are available to support beamforming operations in the time interval. In various such embodiments, responders 204 and 208 may determine whether to use one or more of the available resources to engage in beamforming operations with initiator 202 in the time interval based on the indication. In some embodiments, responders 204 and 208 may determine whether or not to use one or more of the available resources in the time interval based on the indication and their respective classes 206 and 210. In various embodiments, initiator 202 may allocate the available resources to one or more responders or one or more classes of responder. It will be appreciated that while only two responders are depicted in the illustrated embodiment, other embodiments may include any number of responders. Embodiments are not limited in this context.

In various embodiments, one or more of initiator 202, responder 204, and responder 208 may be the same or similar to one or more of 60 GHz-capable devices 102 and 104. In some embodiments, initiator 202 may be an access point (AP), such as a primary basic service set (PBSS) control point (PCP), that wirelessly broadcasts one or more beacon frames announcing a time interval in which beamforming operations may be performed and resources available to support beamforming operations in the time interval. In some such embodiments, responder 204 may be a first station (STA) and responder 208 may be a second STA that each independently receive one or more portions of the wireless transmission from initiator 202. In various embodiments, initiator 202 may begin by identifying one or more resources that are available to support beamforming operations in a time interval, such as a beacon interval. In some embodiments initiator 202 may enable or allocate the use of the one or more resources in the time interval to support beamforming operations, such as a responder sector sweep or association beamforming training (A-BFT). Initiator 202 may then generate a frame for wireless transmission comprising a set of indicator bits encoded with an indication of the one or more resources. In various embodiments, initiator 202 may transmit one or more of the frames in the wireless transmission. For example, initiator 202 may wirelessly broadcast a plurality of the same or similar frame in a plurality of directions, such as by performing an initiator sector sweep during a BTI. In some embodiments, responder 204 and/or responder 208 may receive one or more of the same or similar frames in the wireless transmission. In some such embodiments, responder 204 and/or responder 208 may use the plurality of received frames to estimate a direction and/or location of initiator 202.

In some embodiments, the one or more resources may include time and/or frequency resources. A time resource may include a window of time, such as a subset of a beacon interval, that is available for one or more responders or one or more classes of responder to engage in beamforming operations with initiator 202. In some embodiments, this may include time division multiplexing (TDM). A frequency resource may include one or more channels that are available for one or more responders or one or more classes of responder to engage in beamforming operations with initiator 202. In some embodiments, this may include frequency division multiplexing (FDM).

For instance, initiator 202 may identify a secondary channel that is available in a specific beacon interval. In some embodiments, initiator 202 may enable or determine to use the secondary channel to support beamforming operations in the specific beacon interval. A beacon frame may then be generated with an indication of the secondary channel encoded in a set of indicator bits. In various embodiments, the beacon frame may be broadcast one or more times in one or more directions over a primary channel. In various embodiments, the indication encoded in the indicator bits may comprise a channel hop count that indicates a number of hops the secondary channel is from the primary channel. The channel hop count may be used by responders 204 and 208 to identify the secondary channel to use to carry out further beamforming operations with initiator 202. In some embodiments, non-legacy devices or STAs may carry out further beamforming operations with initiator 202 on the secondary channel and legacy devices or STAs may carry out further beamforming operations with initiator 202 on the primary channel. In various embodiments, this may enable quicker beamforming with greater capacity for responders.

In some embodiments the set of indicator bits may specify one or more classes of responder that are allowed to use the one or more of the available resources in the time interval to engage in beamforming operations. In some such embodiments, initiator 202 may allocate one or more of the available resources to one or more responders or one or more classes of responder for the time interval. For example, class 206, and thus responder 204, may be allowed to use any of two available secondary channels during the time interval and class 210, and thus responder 208 may not be allowed to use any of the available secondary channels during the time interval. In another time interval class 210, and thus responder 208, may be allowed to use any of three available secondary channels during the other time interval and class 206, and thus responder 204, may not be allowed to use any of the available secondary channels.

There is a number of different ways to categorize responders into different classes. In various embodiments, each responder may belong to zero, one, or a plurality of classes. In some embodiments, a class may be defined based features of potential responders (e.g., STAs), such features may include one or more of quality of service (QoS), capability, settings, performance, traffic, hardware, software, and the like. In various embodiments, one or more of the following classes may be used: (1) legacy STA, (2) non-legacy STA (3) STA with power control functionality, (4) calibrated STA, and (5) Out-of-band (OOB) channel-assisted STA. A legacy STA may refer to an 802.11ad-prior STA (or an 802.11ay STA with baseline functionality). A non-legacy STA may refer to an 802.11ay-later STA with extended functionality. A STA with power control functionality may refer to a STA that is able to perform power control during STA transmit sector sweep (TXSS) or A-BFT. In some embodiments, this may solve the near-far problem and reduce the number of collisions. A calibrated STA may refer a type of STA that can decide its best transmit (TX) sector based on its best receive (RX) sector. Hence, such a STA may perform RXSS to find its best RX sector, and then perform random access with the corresponding TX sector. Such STAs can have a preferred beam direction established before uplink transmission, thereby avoiding the need to perform STA TXSS across multiple beam directions. A OBB channel-assisted STA may refer to a STA that can use OBB connectivity, such as Long-Term Evolution (LTE), in order to optimize its random access and sector sweep procedure. The A-BFT period for such STAs is scheduled via the OBB channel in order to minimize contention experienced during sector sweep. In various embodiments, the OBB connectivity may utilize one or more of LTE-Assisted Wireless Gigabit Alliance (WiGiG) initial access and 5G radio access technologies (RAT).

Figure 2B:
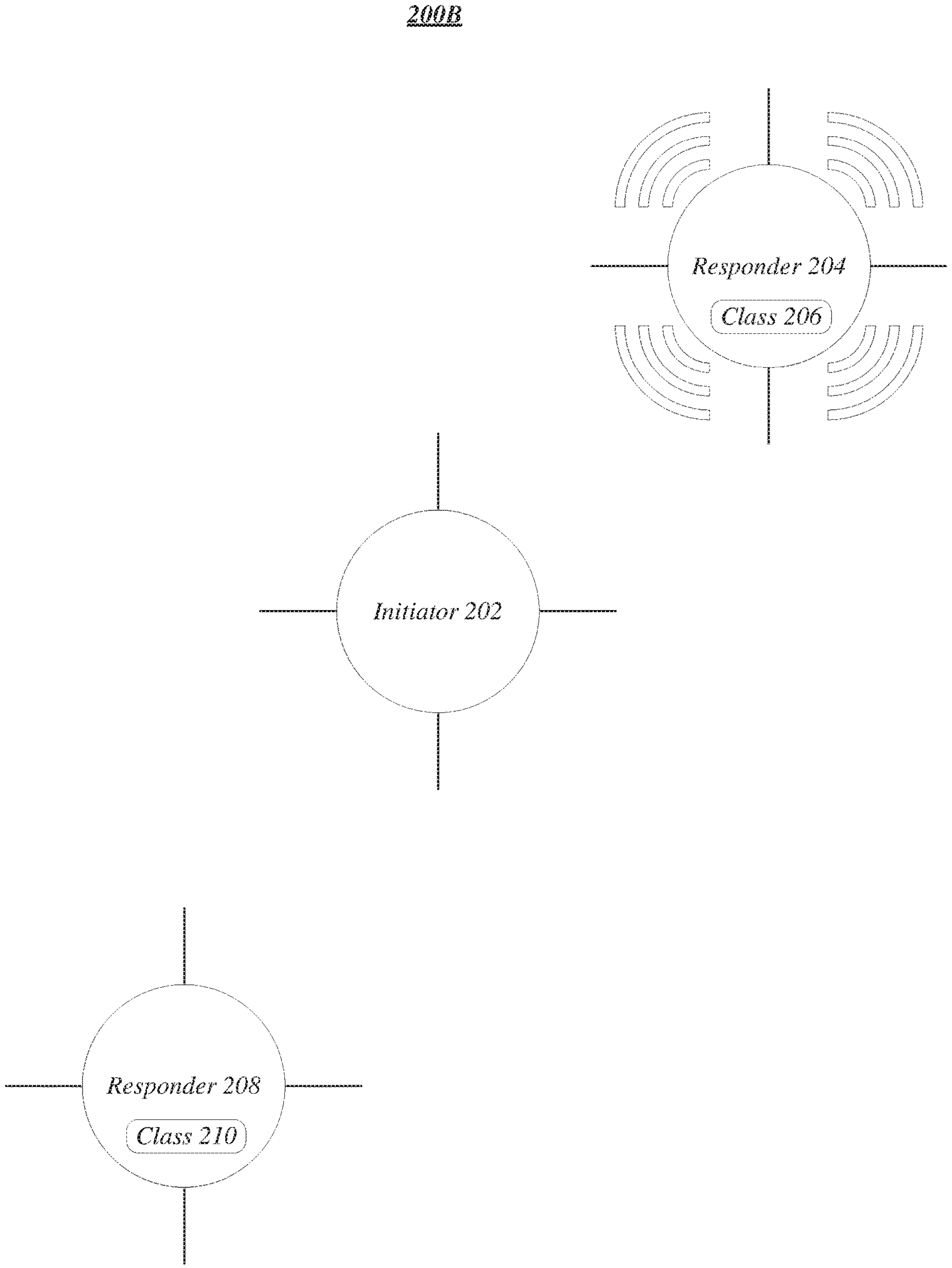
FIG. 2B illustrates an embodiment of a third operating environment.

FIG. 2B illustrates an example of an operating environment 200B that may be representative of beamforming operations one or more responders (e.g., responders 204 and 208) may perform in various embodiments to establish a wireless link with initiator 202. In operating environment 200B, responder 204 and responder 208 have previously received a set of indicator bits in a wireless transmission from initiator 202 indicating available resources in a time interval. In the illustrated embodiment, responder 204 determined to perform one or more beamforming operations with initiator 202 in the time interval based on the indicator bits while responder 208 determined to refrain from performing one or more beamforming operations with initiator 202 in the time interval based on the indicator bits. For example, the set of indicator bits may have included an indication that class 206 may utilize an available resource to engage in beamforming operations with initiator 202 in a time interval and an indication that class 210 may not utilize the available resource to engage in beamforming operations with initiator 202 in the time interval. In various embodiments, initiator 202 may make the wireless transmission over a primary frequency channel to initiate beamforming operations and allocate secondary frequency channels for subsequent beamforming operations. For example, a beacon transmission interval (BTI) may occur over the primary channel and A-BFT may occur over the secondary channel. In various embodiments, having the BTI occur over a primary channel and A-BFT over a secondary channel can significantly reduce the number of collisions, reduce latency, and/or increase the number of responders that can establish a link with the initiator. Embodiments are not limited in this context.

In various embodiments, responder 204 and responder 208 may identify a wireless transmission from initiator 202 comprising a frame with a set of indicator bits encoded with an indication of one or more resources available to support beamforming operations in a time interval. Responder 204 and responder 208 may then determine whether to use a resource of the one or more available resources to engage in one or more beamforming operations in the time interval based on the set of indicator bits. In various embodiments, the set of indicator bits may include a first set of indicator bits encoded with the indication of the one or more resources available to support beamforming operations and a second set of indicator bits encoded with an indication of one or more classes of responder allowed to engage in beamforming operations during the time interval.

In some embodiments, responder 204 and responder 208 may determine one or more classes of responder allowed to engage in beamforming operations with initiator 202 based on the second set of indicator bits. In this embodiment, the second set of indicator bits indicate that only class 206 is allowed to engage in beamforming operations. Responder 208 may compare its class (i.e., class 210) to the class indicated by the second set of indicator bits (i.e., class 206), and determine to not engage in beamforming operations with initiator 202 during the time interval based on the comparison. Responder 204 may compare its class (i.e., class 206) to the class indicated by the second set of indicator bits (i.e., class 206), and determine to engage in beamforming operations with initiator 202 during the time interval based on the comparison. Responder 204 may then determine the available resources in the time interval based on the second set of indicator bits. Responder 204 my then utilize one or more of the available resources to engage in beamforming operations with initiator 202 during the time interval. In various embodiments, responder 204 may engage in beamforming operations including A-BFT and/or one or more beam refinement phases (BRPs) with initiator 202 during the time interval.

Figure 3:
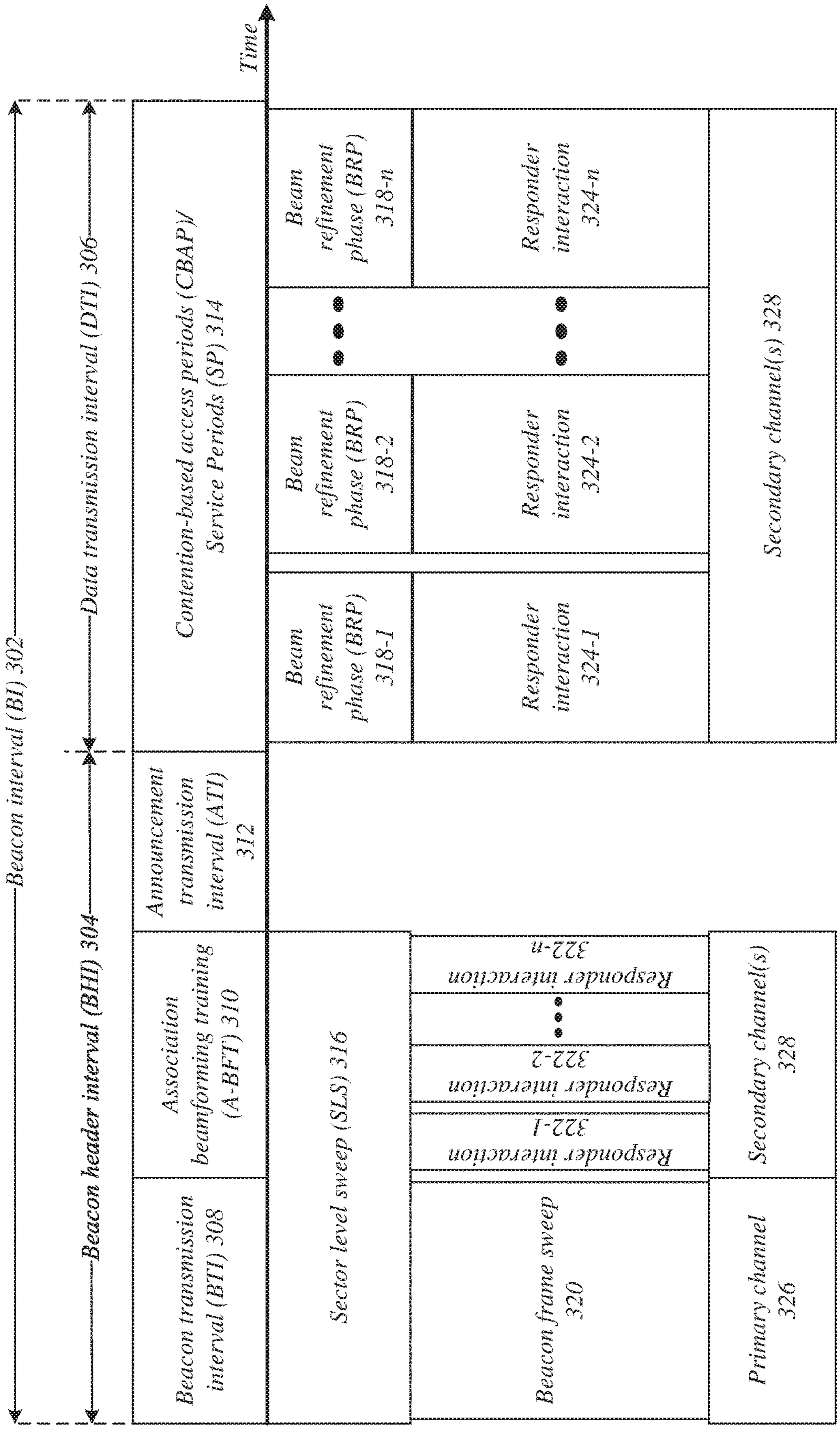
FIG. 3 illustrates an embodiment of a first communications flow.

FIG. 3 illustrates an example of a communications flow 300 that may be representative of beamforming operations in a time interval. In communications flow 300, the time interval in which the beamforming operations occur may be referred to as beacon interval 302. Beacon interval 302 may include a beacon header interval (BHI) 304 followed by a data transmission interval (DTI) 306. In various embodiments, the BHI 304 may facilitate the exchange of management information and networks announcements using a sweep of multiple directionally transmitted frames and the DHI 306 may implement different types of medium access. The BHI 304 may include three sub-intervals, a beacon transmission interval (BTI) 308, association beamforming training (A-BFT) 310, and announcement transmission interval (ATI) 312. The DTI 306 may include one or more contention-based access periods (CBAPs) and service periods (SP) 314. In various embodiments described herein, frames transmitted during BTI 308, such as in beacon frame sweep 320, may include an indication of one or more resources that are available to support beamforming operations during the BI 302. The one or more available resources may be utilized to perform one or more responder interactions 322-1, 322-1, 322-*n* during A-BFT 310. In some embodiments, the one or more resources may additionally or alternately be used to perform one or more responder interactions 324-1, 324-2, 324-*n* in one or more beam refinement phases (BRPs) 318-1, 318-2, 318-*n* during DTI 306. In various embodiments, the one or more available resources may include one or more secondary channel(s) 328. For example, BTI 308 may occur over primary channel 326 and A-BFT 310 and DTI 306 may occur over secondary channel(s) 328 that are indicated as available resources to support beamforming operations during BI 302. In various embodiments, having BTI 308 occur over primary channel 326 and A-BFT 310 over secondary channel(s) 328 can significantly reduce the number of collisions, reduce latency, and/or increase the number of responders that can establish a link with the initiator. Embodiments are not limited in this context.

As previously mentioned, BHI 304 may include the three sub-intervals, BTI 308, A-BFT 310, and ATI 312. In some embodiments, BTI 308 and A-BFT 310 may collectively be referred to as a sector level sweep (SLS) 316. Each of the three sub-intervals will now be described in turn. First, the BTI 308 may include multiple beacon frames that are each transmitted by an initiator (e.g., initiator 202) on a different sector to cover all possible directions (e.g., beacon frame sweep 320). In some embodiments, BTI 308 is used for network announcement and beamforming training of the initiator's antenna sectors. In various embodiments described herein, BTI 308 may occur on primary channel 326. Second, A-BFT 310 may be used by responders (e.g., responders 204 and 208) to train their antenna sectors for communication with the initiator. In various embodiments described herein, A-BFT 310 may occur on one or more secondary channels 328. Third, the announcement transmission interval (ATI) 312 may be used by the initiator to exchange management information with associated and beam-trained STAs. In other words, ATI 312 may not be used for beamforming operations described herein.

In some embodiments, a wireless transmission by an initiator may include beacon frame sweep 320. In various embodiments, responders may receive one or more beacon frames in beacon frame sweep 320. In various such embodiments, responders may utilize the one or more received beacon frames to estimate a direction or location of the initiator. In some embodiments, the responders may determine one or more resources, such as secondary channel(s) 328, to use to engage in one or more beamforming operations with the initiator based on an indication included in one or more beacon frames received in beacon frame sweep 320. In various embodiments, the indication included in one or more beacon frames may identify one or more resources that are available in BI 302, and one or more resources that are not available in BI 302. In some embodiments, the indication included in one or more beacon frames may identify one or more classes of responder that are allowed to use the one or more resources that are available in BI 302. In various embodiments, the indication included in one or more beacon frames may identify one or more classes of responder that are not allowed to use the one or more resources that are available in BI 302. In various such embodiments, each of a plurality of classes of responder may be assigned a different resource. For example, a first class may be directed to use a first secondary channel and a second class may be directed to use a second secondary channel.

In some embodiments, one or more responders may be unable to interpret the indication included in received beacon frames (e.g., legacy STAs). In some such embodiments, the one or more responders that are unable to interpret the indication may engage in one or more beamforming operations during BI 302 using primary channel 326 while responders that are able to interpret the indication (e.g., non-legacy STAs) may engage in one or more beamforming operations during BI 302 using one or more secondary channel(s) 328 as directed to in the indication. In some embodiments, responders that are unable to interpret the indication may be prevented from engaging in beamforming operations during BI 302.

Figure 4:
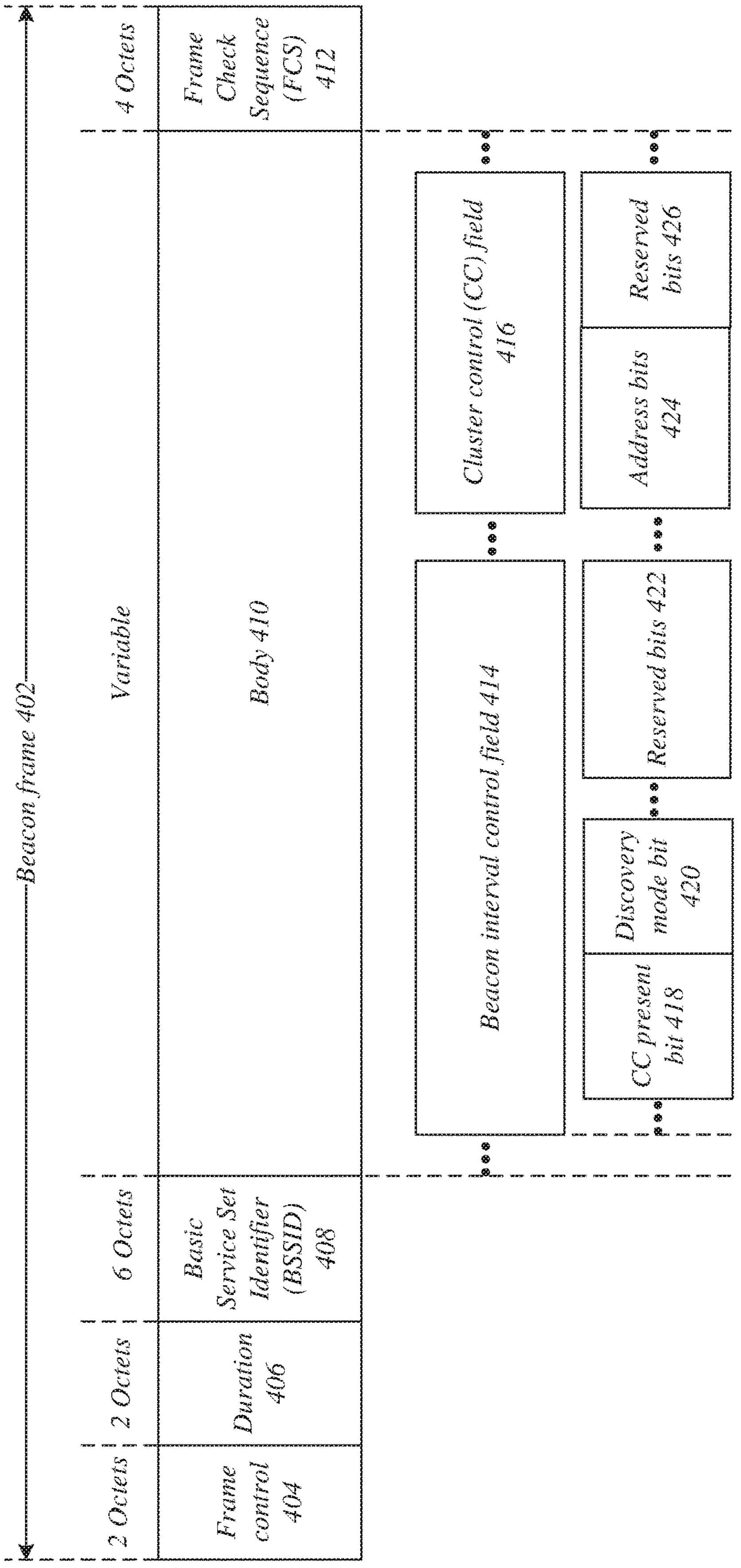
FIG. 4 illustrates an embodiment of a second communications flow.

FIG. 4 illustrates an example of a communications flow 400 that may be representative of one or more frames included in a wireless transmission, such as beacon frame sweep 320, for example. In communications flow 400, beacon frame 402 may be wirelessly broadcast to any potential responders within range to initiate beamforming operations. In various embodiments, beacon frame 402 may include a DMG beacon frame. In some embodiments, beacon frame 402 may include the following fields: frame control 404, duration 406, basic service set identifier (BSSID) 408, body 410, and frame check sequence (FCS) 412. In various embodiments, body 410 may include beacon interval control field 414 and cluster control (CC) field 416. In the illustrated embodiment, beacon interval control field 414 may include CC present bit 418, discovery mode bit 420, and reserved bits 422. The CC field 416 may include address bits 424 and reserved bits 426. In various embodiments described herein, an initiator may indicate one or more resources available to support beamforming operations during a time interval using one or more sets of indicator bits located in one or more of reserved bits 422 and 426. In some embodiments, the initiator may indicate one or more classes that are allowed to use the one or more available resources to engage in beamforming operations during the time interval using one or more of reserved bits 422 and 426. Embodiments are not limited in this context.

As previously mentioned, beacon frame 402 may include frame control 404, duration 406, BSSID 408, body 410, and FCS 412 fields. The frame control 404 field may include two octets and may specify the form and function of the frame. The duration 406 field may include two octets and indicate the time remaining in a beacon transmission interval, such as BTI 308. The BSSID 408 field may include 6 octets and may uniquely identify the network, such as by including the media access control (MAC) address of the initiator. The body 410 field may have a variable length and include a plurality of different fields used to communicate the objective of beacon frame 402 to higher levels. In various embodiments described herein, the body 410 field may include an indication of one or more resources available to support beamforming operations in a time period. In some embodiments, the body field 410 may include an indication of one or more classes of responder that are allowed to use the one or more available resources to engage in beamforming operations in the time period. The FCS 412 field may include four octets and enables for an integrity check of received frames. It will be appreciated that while specific bits in body 410 of beacon frame 402 may be used or described in various embodiments to indicate available resources and/or allowed classes to potential responders, any means to communicate the available resources and/or allowed classes may be used without departing from the scope of this disclosure.

In various embodiments, one or more of CC present bit 418, discovery mode bit 420, and address bits 424 may be used to identify which set of reserved bits 422, 426 the indication is encoded in. For example, if the discovery mode bit 420 is set to '0', then the indication may be encoded in one or more of reserved bits 422. This example will be discussed in more detail below with respect to FIG. 5A. In another example, if the CC present bit 418 and the discovery mode bit 420 are set to '1' and address bits 424 are set to the address of the initiator, then the indication may be encoded in one or more of reserved bits 426. This example will be discussed in more detail below with respect to FIG. 5B.

Figure 5A:
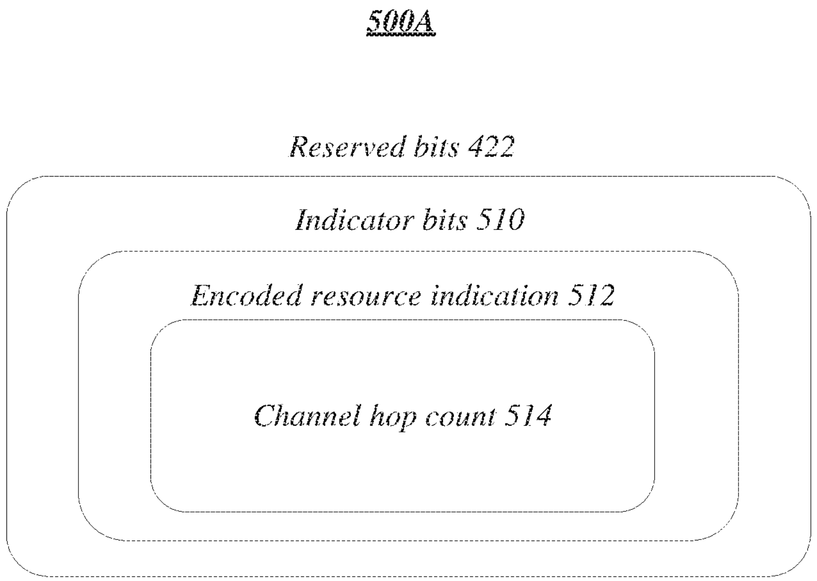
FIG. 5A illustrates an embodiment of a third communications flow.

FIG. 5A illustrates an example of a communications flow 500A that may be representative of one or more indicator bits in a frame generated for wireless transmission in various embodiments to announce one or more resources that are available to support beamforming operations during a time interval. In communications flow 500A, indicator bits 510 may be encoded in one or more of the reserved bits 422 of beacon interval control field 414 by an initiator. In the illustrated embodiments, indicator bits 510 may include encoded resource indication 512 and encoded resource indication 512 may include channel hop count 514. In various embodiments, channel hop count 514 may indicate a number of hops away from a primary channel where a secondary channel that is available to support beamforming operations during a time interval is located. Embodiments are not limited in this context.

In some embodiments, the initiator may communicate that the indicator bits are located in reserved bits 422 of the beacon interval control field 414 by setting discovery mode bit 420 to '0'. In such embodiments, A-BFT of legacy STAs may occur over the primary channel and A-BFT of non-legacy STAs may occur on the secondary channel determined from channel hop count 514. In various embodiment, in order to announce to non-legacy STAs the secondary channels they may use for A-BFT, two bits in reserved bits 422 may be used as indicator bits 510. In various such embodiments, a combination of '10' may indicate that the available secondary channel is one hop away from the primary channel, a combination of '01' may indicate that the available secondary channel is two hops away from the primary channel, and a combination of '11' may indicate that the available secondary channel is three hops away from the primary channel.

In various embodiments, a non-legacy STA uses the channel hop count 514 along with the location of the primary channel to determine the location of the secondary channel dedicated to beamforming operations with non-legacy STAs. In various embodiments, to determine the secondary channel based on channel hop count 514, a non-legacy STA may count the channels sequentially that are above the primary channel and then continue with the channels that are below the primary channel. For example, if the available secondary channel was three hops away and there were four total channels with channel two being the primary channel, then the available secondary channel would be channel 1.

In some embodiments, reserved bits 422 may be used to create priority zone in time rather than frequency. For example, reserved bits 422 may be used to indicate a length of an A-BFT period dedicated to non-legacy STAs. In some such embodiments, an A-BFT length field (not shown) in the beacon interval control field 414 may be set to '0' to prevent legacy STAs from engaging in beamforming operations during the time interval. In some embodiments, new fields may be added to beacon interval control field 414 to indicate the presence of a priority A-BFT period instead of using reserved bits 422.

Figure 5B:
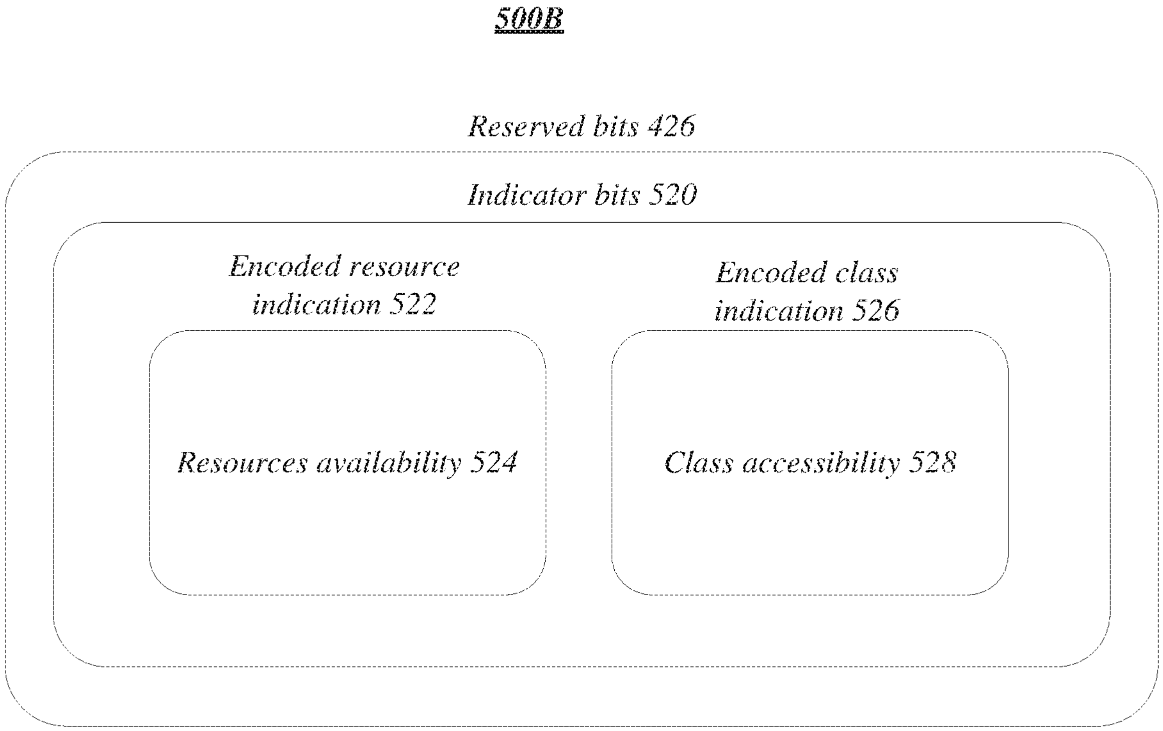
FIG. 5B illustrates an embodiment of a fourth communications flow.

FIG. 5B illustrates an example of a communications flow 500B that may be representative of one or more indicator bits in a frame generated for wireless transmission in various embodiments to announce one or more resources that are available to support beamforming operations during a time interval and one or more classes of responder allowed to utilize the one or more available resources in the time interval to engage in beamforming operations. In communications flow 500B, indicator bits 520 may be encoded in one or more of the reserved bits 426 of the CC field 416 by an initiator. In the illustrated embodiment, indicator bits 520 may include encoded resource indication 522 and encoded class indication 526. The encoded resource indication 522 may include resource availability 524 and encoded class indication 526 may include class accessibility 528. In various embodiments, resource availability 524 may indicate one or more resources that are available to support beamforming operations in a time interval. In some embodiments, class accessibility 528 may indicate one or more classes of responder that are allowed to utilize one or more of the available resources to engage in beamforming operations during the time interval. Embodiments are not limited in this context.

In various embodiments, resource availability 524 may indicate one or more resources that are available to support beamforming operations in a time interval. In various such embodiments, resource availability 524 may indicate one or more resources that are not available to support beamforming operations in the time interval. For example, resource availability 524 may indicate the availability of each secondary channel in a set of secondary channels by using a binary value, such as a bit, for each secondary channel in the set to indicate whether or not a particular secondary channel is available. In some embodiments, class accessibility 528 may indicate one or more classes of responder that are allowed to utilize one or more of the available resources to engage in beamforming operations during the time interval. In some such embodiments, class accessibility 528 may indicate one or more classes of responder that are not allowed to utilized one or more of the available resources to engage in beamforming operations during the interval. For example, class accessibility 528 may indicate accessibility for each class in a set of responder classes by using a binary value, such as a bit, for each class in the set to indicate whether or not a particular class is allowed to use the one or more resources to engage in beamforming operations in the time interval.

In some embodiments, the initiator may communicate that the indicator bits are located in reserved bits 426 of the CC field 416 by setting the CC present bit 418 and discovery mode bit 420 of the beacon interval control field 414 to '1', and setting the address bits 424 of the CC field 416 to the MAC address of the initiator. By setting the discovery mode bit 420 to '1', the initiator can specify classes of STA that are allowed to engage in one or more beamforming operations during A-BFT. By setting address bits 424 to the MAC address of the initiator, legacy STAs would not respond. Non-legacy STAs may then use one or more indicator bits 520 in reserved bits 426 of the CC field 416 to figure out the time-wise and/or frequency-wise configurations one the one or more resources available to perform beamforming operations in the time interval. In various embodiments, a policy may be applied to the indicator bits 520 to determine the time-wise and/or frequency-wise configurations of the available resources and/or the allowed classes of STA. It will be appreciated that although specific ways to figure out the time-wise and/or frequency-wise configurations of resources based on a set of indicator bits may be used or described in various embodiments, any means to figure out the time-wise and/or frequency-wise configurations of resources may be used without departing from the scope of this disclosure.

In various embodiments, an ordering policy may be used to figure out the time-wise and/or frequency-wise configurations of resources based on a set of indicator bits. In various embodiments, the ordering policy may be based on different STA classes. For example, if only one secondary channel is available at the initiator, STAs in the highest priority class can use that channel to perform A-BFT. Similarly, if two channels are available, then STAs in the two highest priority classes may be able to use those channels for A-BFT. This procedure may continue for all STA classes.

In some embodiments, a channel mapping policy may be used to figure out the time-wise and/or frequency-wise configurations of resources based on a set of indicator bits. In some embodiments, the channel mapping policy may map available channels to different STA classes. For example, STAs in the highest priority class may always use the first available secondary channel above the primary channel, or if no secondary channel above the primary channel is available, the first secondary channel below the primary channel may be used, or if no secondary channel below the primary channel is available, then the primary channel may be used for A-BFT. In various embodiments, the same method may be used for STAs in the second highest priority class. For example, these STAs may mark the channel used by the STAs in the highest priority class as occupied, and use the next available secondary channel (e.g., the first channel above the primary channel and if none exists the first available below the primary channel) for their A-BFT. This procedure may continue for all STA classes.

In different embodiments address bits 424 of CC field 416 may be used in different ways to separate out legacy and non-legacy devices. In one embodiment a "well-known" MAC address may be provided in address bits 424. Such a "well-known" address could be part of an IEEE 802.11 specification or may be communicated via an OOB or LTE channel for such classes of STA. In some embodiments, address bits 424 may be set to the MAC address of a LTE/OOB assisted STA. In some such embodiments, the identified STA may thereby be explicitly scheduled to transmit during an associated A-BFT period. In various embodiments, such scheduling may request additional coordination between the AP and the controller of the OOB RAT (e.g., eNB). In some embodiments, an OOB channel may be used to exchange a specific address to screen for in address bits 424. In some such embodiments, the addressing may cover one or more classes of STA rather than a single STA.

In various embodiments, an initiator may use one or more of reserved bits 426 to announce the secondary channels that are available. In some embodiments, the number of bits may depend on the number of channels. For example, four channels, each with 2.16 GHz bandwidth (from 57.24 GHz to 65.88 GHz) are available in IEEE 802.11ad. An initiator may use four bits of reserved bits 426 to indicate resource accessibility 524. For instance, if a bit is set to '1' the associated channel is available. STAs in each class may use the above information along with one or more policies, such as the ordering and/or channel mapping policies described herein to figure out a channel that may be specifically allocated for their class of STA to perform beamforming operations. In various embodiments, if a channel is not available at the STA, the STA may still use the primary channel.

In some embodiments, the initiator may use one or more of reserved bits 426 to restrict beamforming operations in a time period to one or more allowed classes of STA. For example, if there are three classes of non-legacy STAs, the initiator can use three bits of reserved bits 426 to indicate class accessibility 528. In various embodiments, if a bit is set to '1', then the associated class of STA is allowed to engage in beamforming operations in the time interval. In various such embodiments, if the bit is set to '0', then the associated class of STA may not be allowed to engage in beamforming operations in the time interval. In some embodiments, if STAs from a particular class are precluded from access, then they would not occupy a secondary channel. In some such embodiments, STAs in other classes may consider this information in the channel mapping policy when finding their secondary channel.

FIG. 6 illustrates one embodiment of a logic flow 600, which may be representative of operations that may be executed in various embodiments in conjunction with the resource allocation techniques for beamforming training. The logic flow 600 may be representative of some or all of the operations that may be executed by one or more of 60 GHz-capable devices 102 and 104 of FIG. 1 and initiator 202 of FIG. 2. Embodiments are not limited in this context.

In the illustrated show in FIG. 6, the logic flow 600 may begin at block 604. At block 604 "identify one or more resources available to support beamforming operations in a time interval" one or more resources available to support beamforming operations in a time interval may be identified. For example, initiator 202 may determine one or more secondary channels that are available during BI 302 or A-BFT 310 to support beamforming operations with responder 204. In some embodiments, the one or more resources available to support beamforming operations may include one or more of time and frequency resources.

Continuing to block 606 "enable the access point (AP) to use the one or more resources in the time interval to interact with one or more allowed classes of station (STA) to perform one or more beamforming operations" the AP may be enabled to use the one or more resources in the time interval to interact with one or more allowed classes of STA to perform one or more beamforming operations. For example, initiator 202 may enable one or more classes of responder, such as responder 204 with class 206 and/or responder 208 with class 210, to interact with initiator 202 to perform one or more beamforming operations during beacon interval 302 or A-BFT 310. In various embodiments, the AP may be enabled to use the one or more resources to interact with one or more allowed classes of STA by generating a frame for wireless transmission or encoding an indication in a set of indicator bits, such as indicator bits 510 or 520.

At block 608 "generate a frame for wireless transmission comprising a set of indicator bits encoded with an indication of the one or more resources" a frame for wireless transmission comprising a set of indicator bits encoded with an indication of the one or more resources may be generated. For example, initiator 202 may generate beacon frame 402 for wireless transmission and one or more of reserved bits 422 and 426 may include an indication (i.e. indicator bits 510, 520) of the one or more resources that are available to support beamforming operations during BI 302. In various embodiments, the set of indicator bits may include a first set of indicator bits encoded with an indication of the one or more resources (e.g., resource availability 524) and a second set of indicator bits encoded with an indication of the one or more allowed classes of STA (e.g., class accessibility 528). Logic flow 700A of FIG. 7A and logic flow 700B of FIG. 7B indicate two potential methods to generate a frame for wireless transmission comprising a set of indicator bits encoded with an indication of the one or more resources.

Figure 7A:
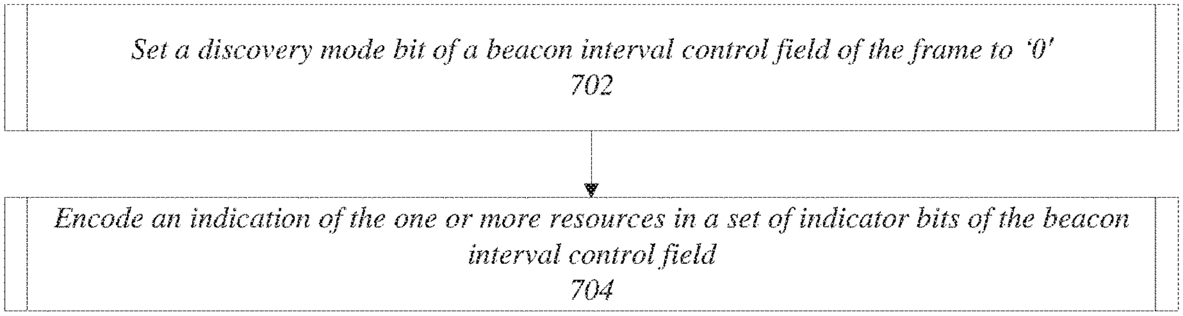
FIG. 7A illustrates an embodiment of a second logic flow.

FIG. 7A illustrates one embodiment of a logic flow 700A, which may be representative of operations that may be executed in various embodiments in conjunction with the resource allocation techniques for beamforming training. The logic flow 700A may be representative of some or all of the operations that may be executed by one or more of 60 GHz-capable devices 102 and 104 of FIG. 1 and initiator 202 of FIG. 2. Embodiments are not limited in this context.

In the illustrated embodiment shown in FIG. 7A, the logic flow 700A may begin at block 702. At block 702 "set a discovery mode bit of a beacon interval control field of the frame to '0'" a discovery mode bit of a beacon interval control field of the frame may be set to '0'. For example, initiator 202 may generate beacon frame 402 and set discovery mode bit 420 to '0'. In various embodiments, setting the discovery mode bit 420 to '0' may cause non-legacy STAs to use a secondary channel to perform one or more beamforming operations during BI 302 according to encoded resource indication 512 and legacy STAs to use the primary channel to perform one or more beamforming operations during BI 302.

Continuing to block 704 "encode an indication of the one or more resources in a set of indicator bits of the beacon interval control field" an indication of the one or more resources may be encoded in a set of indicator bits of the beacon control interval field. For example, initiator 202 may use indicator bits 510 to encode an indication of the one or more resources in reserved bits 422 of the beacon interval control field 414 of beacon frame 402. In various embodiments, a responder may utilize channel hop count 514 to determine a secondary channel to perform A-BFT 310.

Figure 7B:
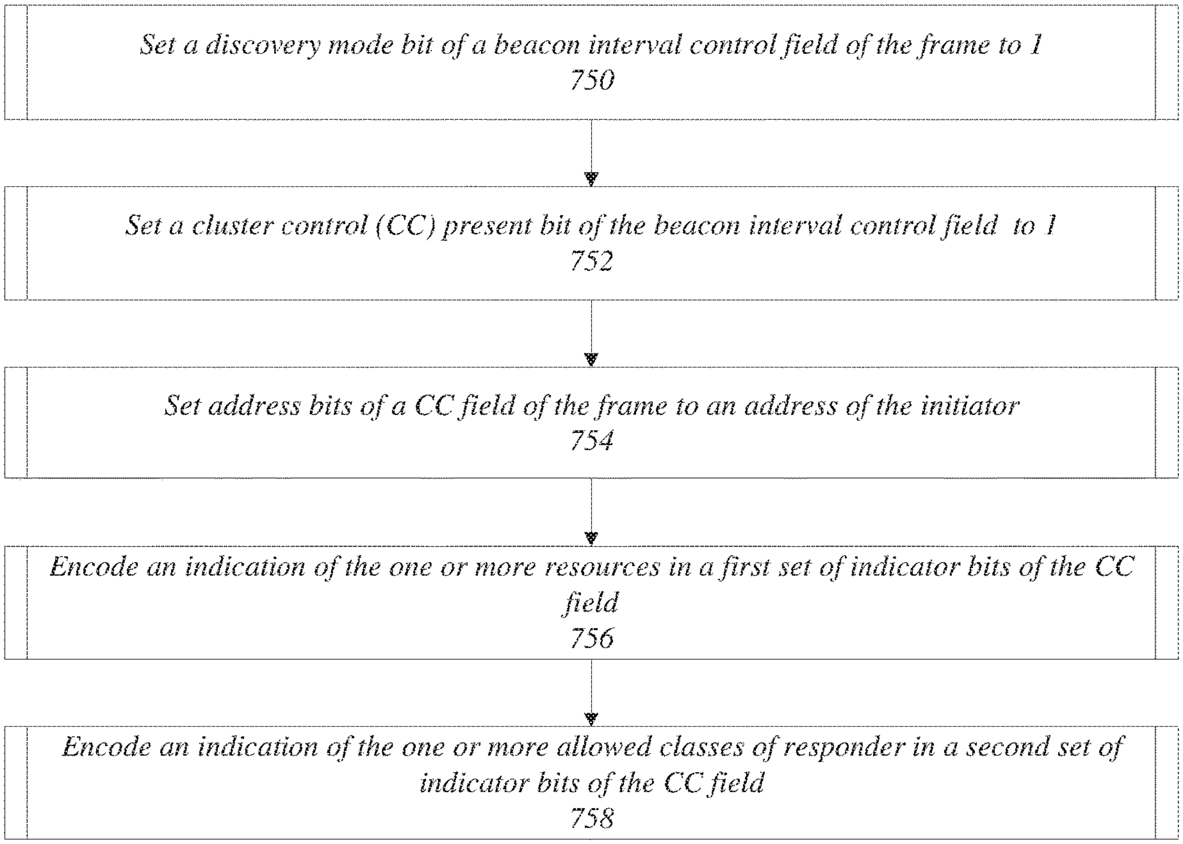
FIG. 7B illustrates an embodiment of a third logic flow.

FIG. 7B illustrates one embodiment of a logic flow 700B, which may be representative of operations that may be executed in various embodiments in conjunction with the resource allocation techniques for beamforming training. The logic flow 700B may be representative of some or all of the operations that may be executed by one or more of 60 GHz-capable devices 102 and 104 of FIG. 1 and initiator 202 of FIG. 2. Embodiments are not limited in this context.

In the illustrated embodiment shown in FIG. 7B, the logic flow 700B may begin at block 750. At block 750 "set a discovery mode bit of a beacon interval control field of the frame to '1'" a discovery mode bit of a beacon interval control field of the frame may be set to '1'. For example, initiator 202 may generate beacon frame 402 and set discovery mode bit 420 to '1'. Continuing to block 752 "set a cluster control (CC) present bit of the beacon interval control field to '1'" a CC present bit of the beacon interval control field may be set to '1'. For example, initiator 202 may generate beacon frame 402 and set CC present bit 418 to '1'. Proceeding to block 754 "set address bits of a CC field of the frame to an address of the initiator" the address bits of a CC field of the frame may be set to the address of the initiator. For example, address bits 424 of CC field 416 in beacon frame 402 may be set to the address of initiator 202. In some embodiments, the address of initiator 202 may include the MAC address of initiator 202.

At block 756 "encode an indication of the one or more resources in a first set of indicator bits of the CC field" an indication of the one or more resources may be encoded in a first set of indicator bits. For example, initiator 202 may encode resource availability 524 in encoded resource indication 522 of indicator bits 520. In various embodiments, encoded resource indication 522 may be included in reserved bits 426 of CC field 416. Continuing to block 758 "encode an indication of one or more allowed classes of responder in a second set of indicator bits of the CC field" an indication of the one or more allowed classes of responder may be encoded in a second set of indicator bits of the CC field. For example, initiator 202 may encode class accessibility 528 in encoded class indication 526 of indicator bits 520. In various embodiments, encoded class indication 526 may be included in reserved bits 426 of CC field 416.

Figure 8A:
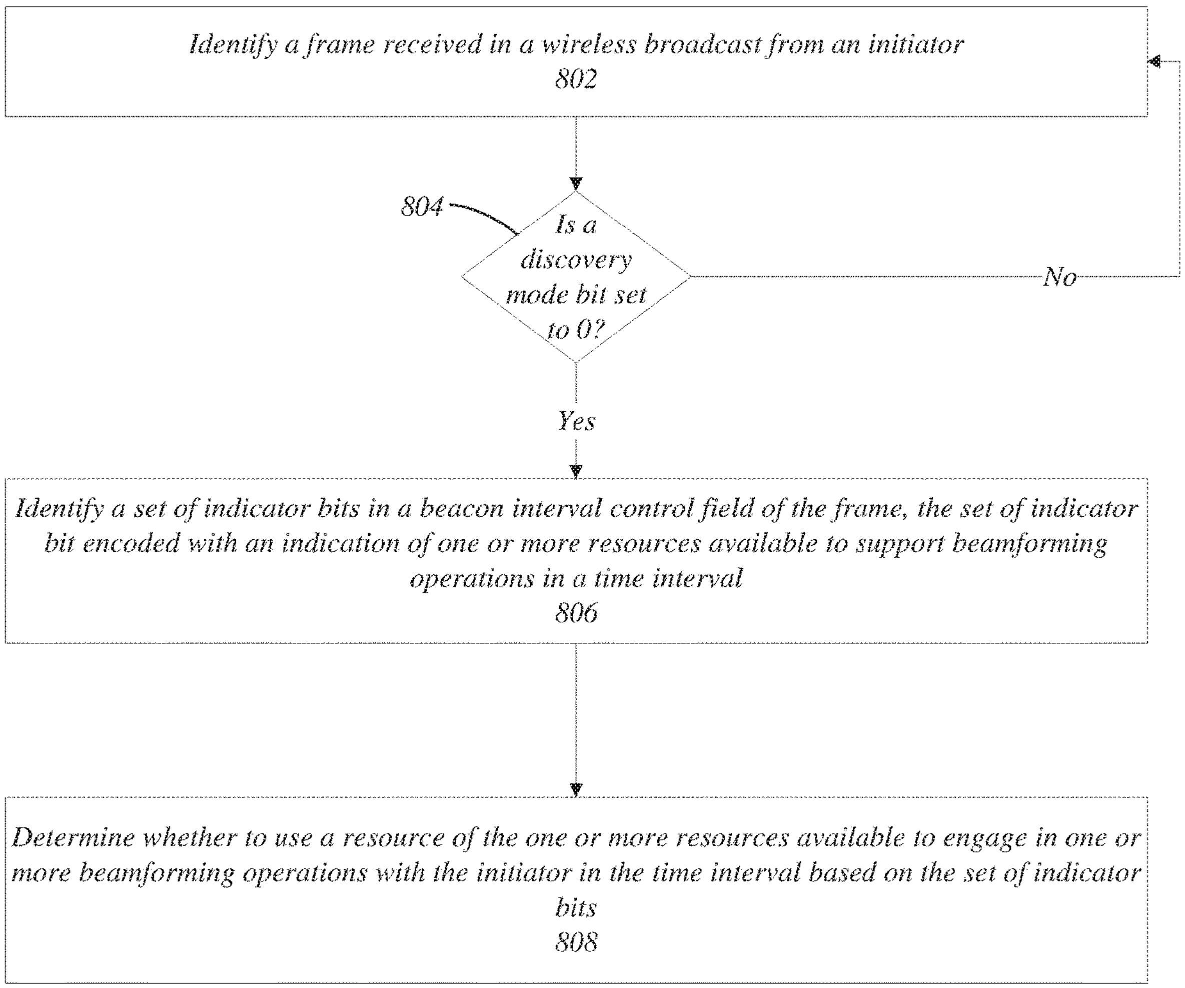
FIG. 8A illustrates an embodiment of a fourth logic flow.

FIG. 8A illustrates one embodiment of a logic flow 800A, which may be representative of operations that may be executed in various embodiments in conjunction with the resource allocation techniques for beamforming training. The logic flow 800A may be representative of some or all of the operations that may be executed by one or more of 60 GHz-capable devices 102 and 104 of FIG. 1 and responders 204 and 208 of FIG. 2. Embodiments are not limited in this context.

In the illustrated embodiment shown in FIG. 8A, the logic flow 800A may begin at block 802. At block 802 "identify a frame received in a wireless transmission from an initiator" a frame received from an initiator in a wireless transmission may be received. For example, responder 204 may identify a beacon frame 402 received in a wireless transmission from initiator 202. In various embodiments, responder 204 may identify a plurality of beacon frames 402 received in a wireless transmission from initiator 202.

Continuing to block 804 "is discovery mode bit set to '0'", it may be determined if a discovery mode bit in the frame received in a wireless transmission is set to '0'. For example, responder 204 may determine whether discovery mode bit 420 of beacon frame 402 is set to '0'. If the discovery mode bit 420 is not set to '0', logic flow 800A may return to block 802. If the discovery mode bit 420 is set to '0', logic flow 800A may proceed to block 806.

In block 806 "identify a set of indicator bits in a beacon interval control field of the frame, the set of indicator bits encoded with an indication of one or more resources available to support beamforming operations in a time interval" a set of indicator bits encoded with an indication of one or more resources available to support beamforming operations in a time interval may be identified. For example, responder 204 may identify reserved bits 422 of the beacon interval control field 414 of beacon frame 402 that include indicator bits 510 that include encoded resource indication 512. In various embodiments, encoded resource indication 512 may indicate one or more resources available to support beamforming operations in BI 302.

Proceeding to block 808 "determine whether to use a resource of the one or more resources available to engage in one or more beamforming operations with the initiator in the time interval based on the set of indicator bits" the set of indicator bits may be used to determine whether or not to use a resource of the one or more resources available to engage in one or more beamforming operations with the initiator in the time interval. For example, responder 204 may determine channel hop count 514 based on indicator bits 510 and identify a secondary channel to use to engage in one or more beamforming operations with initiator 202 during BI 302 or A-BFT 310. In some embodiments, if no available secondary channels can be identified based on channel hop count 514, responder 204 may determine not to use a resource of the one or more resources available to engage in one or more beamforming operations with initiator 202 during BI 320 of A-BFT 310.

Figure 8B:
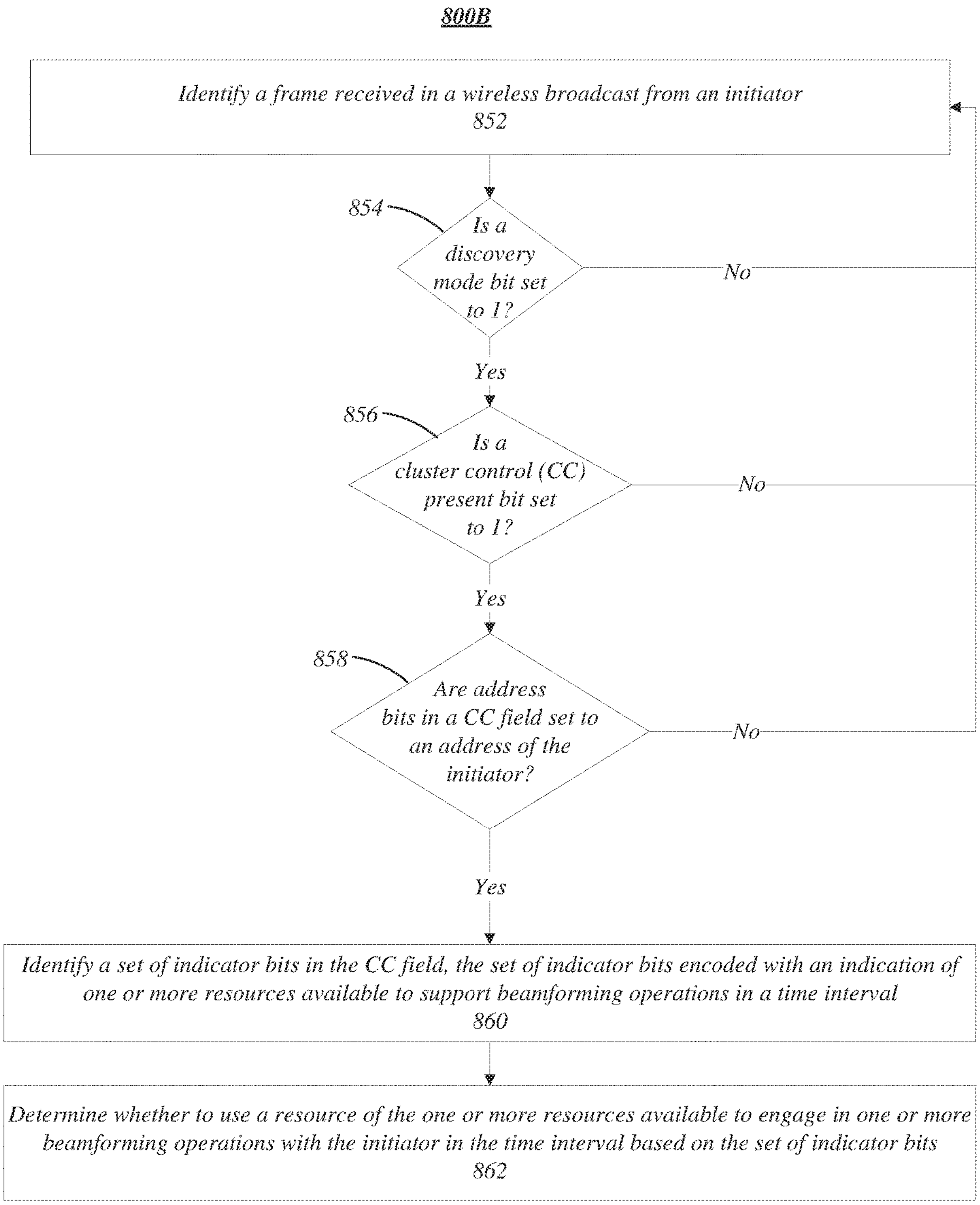
FIG. 8B illustrates an embodiment of a fifth logic flow.

FIG. 8B illustrates one embodiment of a logic flow 800B, which may be representative of operations that may be executed in various embodiments in conjunction with the resource allocation techniques for beamforming training. The logic flow 800B may be representative of some or all of the operations that may be executed by one or more of 60 GHz-capable devices 102 and 104 of FIG. 1 and responders 204 and 208 of FIG. 2. Embodiments are not limited in this context.

In the illustrated embodiment shown in FIG. 8B, the logic flow 800B may begin at block 852. At block 852 "identify a frame received in a wireless transmission from an initiator" a frame received from an initiator in a wireless transmission may be received. For example, responder 204 may identify a beacon frame 402 received in a wireless transmission from initiator 202. In various embodiments, responder 204 may identify a plurality of beacon frames 402 received in a wireless transmission from initiator 202.

Continuing to block 854 "is discovery mode bit set to '1'", it may be determined if a discovery mode bit in the frame received in a wireless transmission is set to '1'. For example, responder 204 may determine whether discovery mode bit 420 of beacon frame 402 is set to '1'. If the discovery mode bit 420 is not set to '1', logic flow 800B may return to block 852. If the discovery mode bit 420 is set to '1', logic flow 800B may proceed to block 856.

Proceeding to block 856 "is cluster control present bit set to '1'", it may be determined if a CC present bit in the frame received in the wireless transmission is set to '1'. For example, responder 204 may determine whether CC present bit 418 of beacon frame 402 is set to '1'. If the CC present bit 418 is not set to '1', logic flow 800B may return to block 852. If the CC present bit 418 is set to '1'. logic flow 800B may proceed to block 858.

At block 858 "are address bits in a CC field set to an address of the initiator" it may be determined if address bits in a CC field are set to an address of the initiator. For example, responder 204 may determine whether address bits 424 of CC control field 416 is set to the address of initiator 202. If the address bits 424 are not set to the address of initiator 202, logic flow 800B may return to block 852. If the address bits 424 are set to the address of initiator 202, logic flow 800B may proceed to block 860. In various embodiments, the address bits 424 may be set to a "well-known" MAC address, such as a MAC address that is part of the specification.

In block 860 "identify a set of indicator bits in the CC filed, the set of indicator bits encoded with an indication of one or more resources available to support beamforming operations in a time interval" a set of indicator bits encoded with an indication of one or more resources available to support beamforming operations in a time interval may be identified. For example, responder 204 may identify reserved bits 426 of the CC field 416 of beacon frame 402 that include indicator bits 520 that include encoded resource indication 522. In various embodiments, encoded resource indication 522 may indicate one or more resources available to support beamforming operations in BI 302.

Proceeding to block 862 "determine whether to use a resource of the one or more resources available to engage in one or more beamforming operations with the initiator in the time interval based on the set of indicator bits" the set of indicator bits may be used to determine whether or not to use a resource of the one or more resources available to engage in one or more beamforming operations with the initiator in the time interval. For example, responder 204 may determine resource availability 524 based on indicator bits 520 and identify a secondary channel to use to engage in one or more beamforming operations with initiator 202 during BI 302 or A-BFT 310. In some embodiments, responder 204 may determine resource availability 524 and class accessibility 528 based on indicator bits 520. In some such embodiments, responder 204 may determine whether to use a resource of the one or more resources available to engage in one or more beamforming operations with the initiator 202 during BI 302 or A-BFT 310 based on both resource availability 524 and class accessibility 528.

Figure 9:
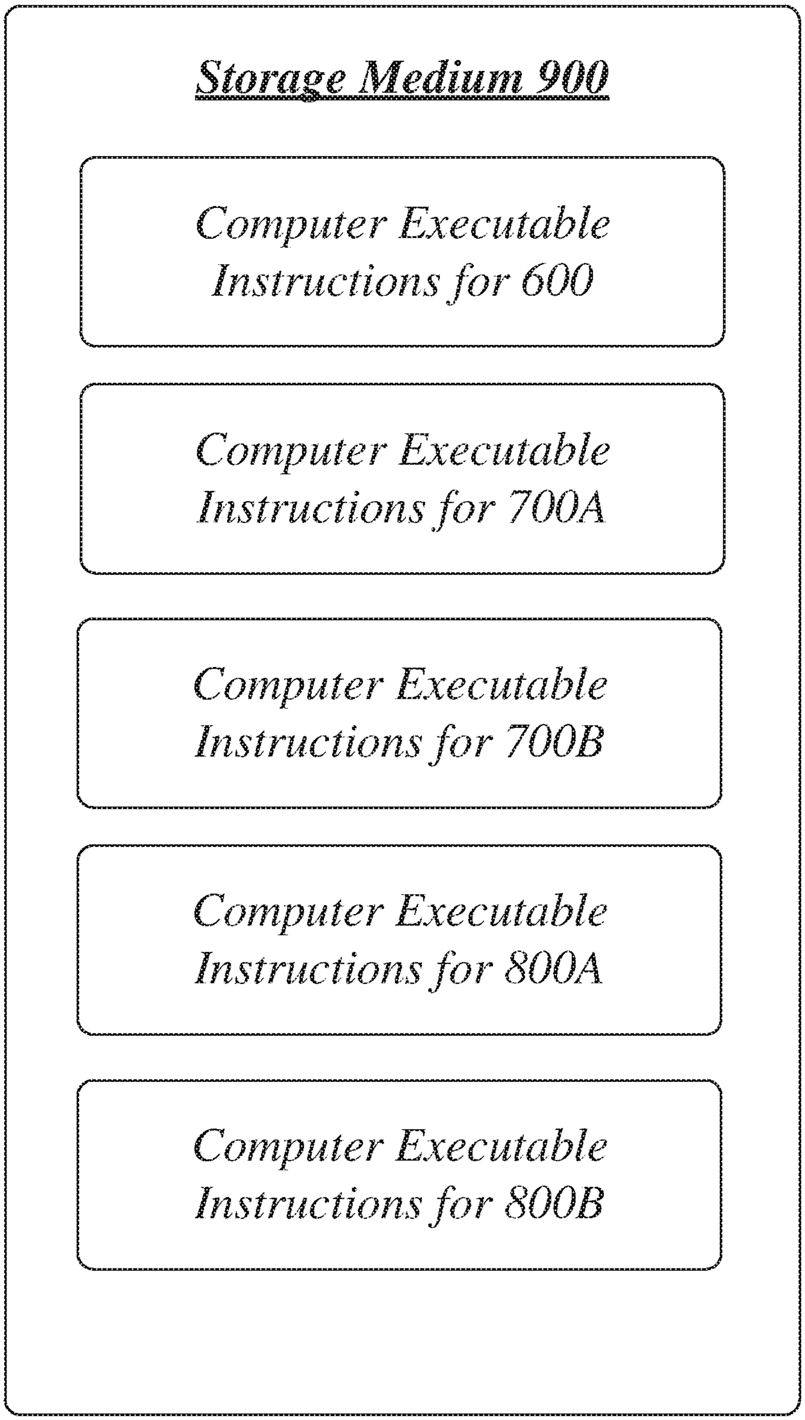
FIG. 9 illustrates an embodiment of a storage medium.

FIG. 9 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement one or more of logic flow 600 of FIG. 6, logic flow 700A of FIG. 7A, logic flow 700B of FIG. 7B, logic flow 800A of FIG. 8A, and logic flow 800B of FIG. 8B. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
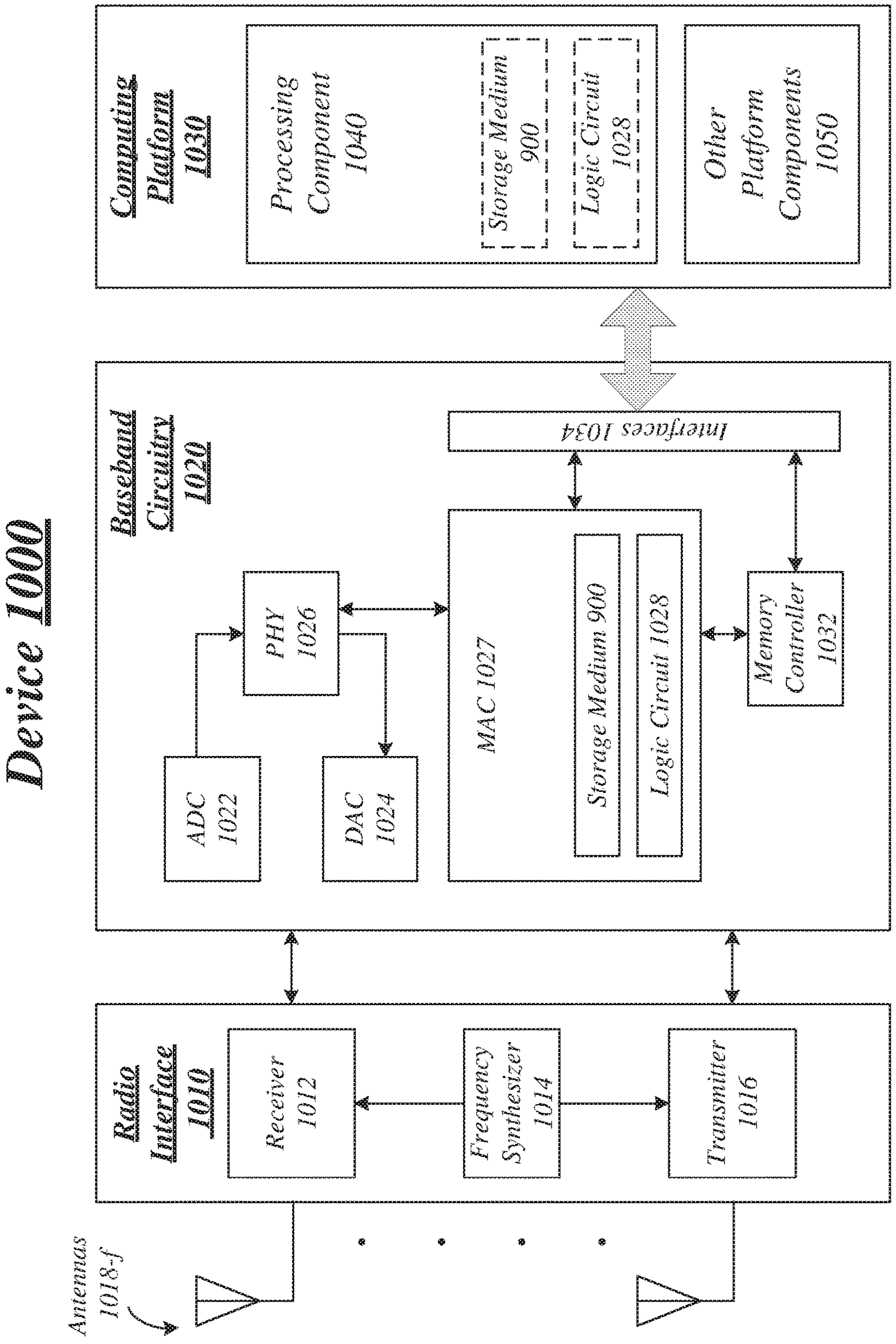
FIG. 10 illustrates an embodiment of a device.

FIG. 10 illustrates an embodiment of a communications device 1000 that may implement one or more of 60 GHz-capable devices 102 and 104 of FIG. 1, initiator 202 and responders 204, 208 of FIGS. 2A and 2B, logic flow 600 of FIG. 6, logic flow 700A of FIG. 7A, logic flow 700B of FIG. 7B, logic flow 800A of FIG. 8A, and logic flow 800B of FIG. 8B, and storage medium 900 of FIG. 9. In various embodiments, device 1000 may comprise a logic circuit 1028. The logic circuit 1028 may include physical circuits to perform operations described for one or more of 60 GHz-capable devices 102 and 104 of FIG. 1, initiator 202 and responders 204, 208 of FIGS. 2A and 2B, logic flow 600 of FIG. 6, logic flow 700A of FIG. 7A, logic flow 700B of FIG. 7B, logic flow 800A of FIG. 8A, and logic flow 800B of FIG. 8B, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of 60 GHz-capable devices 102 and 104 of FIG. 1, initiator 202 and responders 204, 208 of FIGS. 2A and 2B, logic flow 600 of FIG. 6, logic flow 700A of FIG. 7A, logic flow 700B of FIG. 7B, logic flow 800A of FIG. 8A, and logic flow 800B of FIG. 8B, storage medium 900 of FIG. 9, and logic circuit 1028 in a single computing entity, such as entirely within a single device. Alternatively, the device 1000 may distribute portions of the structure and/or operations for one or more of 60 GHz-capable devices 102 and 104 of FIG. 1, initiator 202 and responders 204, 208 of FIGS. 2A and 2B, logic flow 600 of FIG. 6, logic flow 700A of FIG. 7A, logic flow 700B of FIG. 7B, logic flow 800A of FIG. 8A, and logic flow 800B of FIG. 8B, storage medium 900 of FIG. 9, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-*f*. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively, or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of 60 GHz-capable devices 102 and 104 of FIG. 1, initiator 202 and responders 204, 208 of FIGS. 2A and 2B, logic flow 600 of FIG. 6, logic flow 700A of FIG. 7A, logic flow 700B of FIG. 7B, logic flow 800A of FIG. 8A, and logic flow 800B of FIG. 8B, storage medium 900 of FIG. 9, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
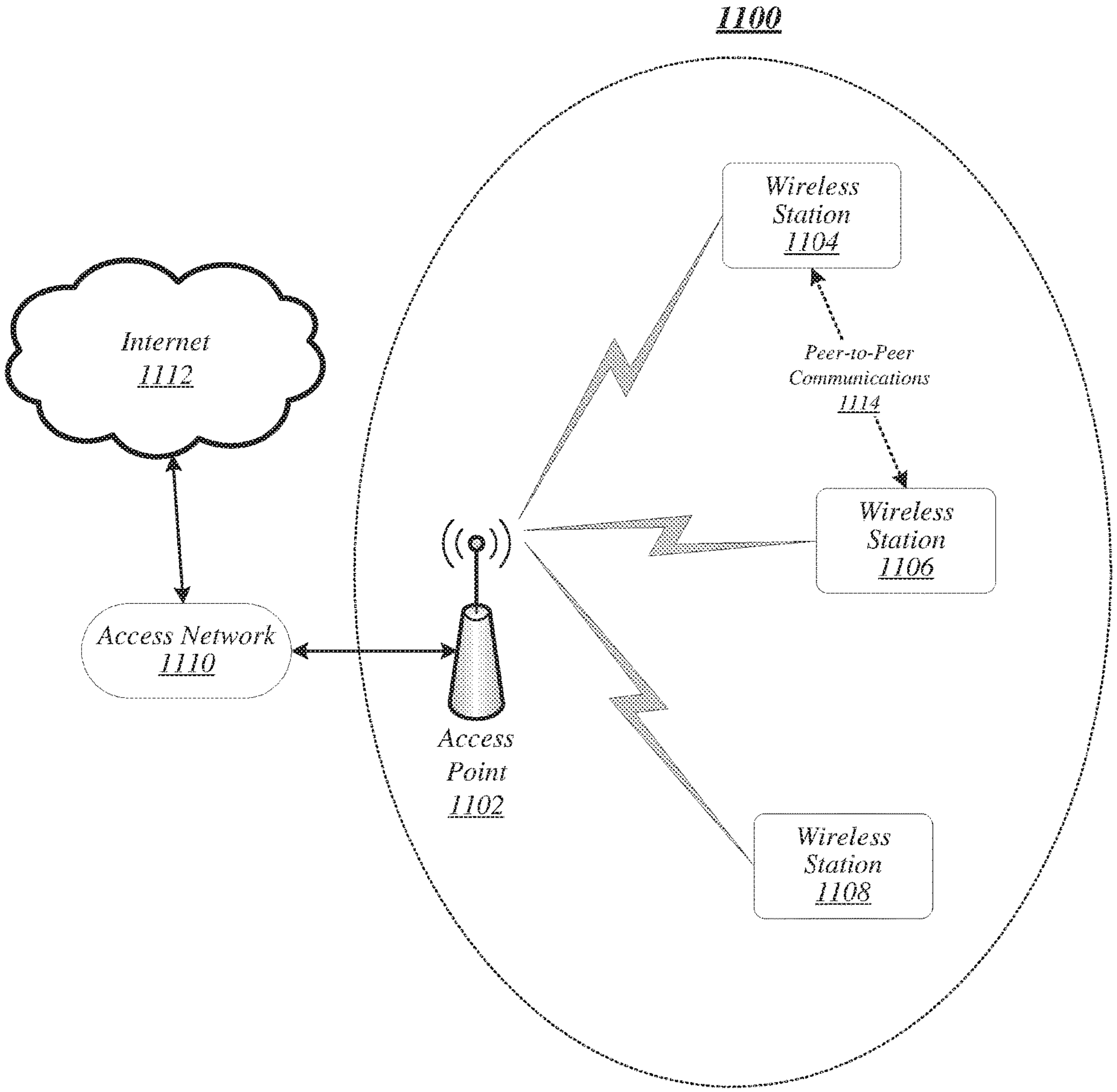
FIG. 11 illustrates an embodiment of a wireless network.

FIG. 11 illustrates an embodiment of a wireless network 1100. As shown in FIG. 11, wireless network comprises an access point 1102 and wireless stations 1104, 1106, and 1108. In various embodiments, wireless network 1100 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1100 may comprise another type of wireless network, and/or may implement other wireless communications standards. In various embodiments, for example, wireless network 1100 may comprise a WWAN or WPAN rather than a WLAN. The embodiments are not limited to this example.

In some embodiments, wireless network 1100 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1104, 1106, and 1108 may communicate with access point 1102 in order to obtain connectivity to one or more external data networks. In some embodiments, for example, wireless stations 1104, 1106, and 1108 may connect to the Internet 1112 via access point 1102 and access network 1110. In various embodiments, access network 1110 may comprise a private network that provides subscription-based Internet-connectivity, such as an Internet Service Provider (ISP) network. The embodiments are not limited to this example.

In various embodiments, two or more of wireless stations 1104, 1106, and 1108 may communicate with each other directly by exchanging peer-to-peer communications. For example, in the example of FIG. 11, wireless stations 1104 and 1106 communicate with each other directly by exchanging peer-to-peer communications 1114. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which number permutations and configurations will be apparent.

Example 1 is an apparatus for wireless communication, comprising: a memory; and logic for an access point (AP), at least a portion of the logic implemented in circuitry coupled to the memory, the logic to: identify one or more resources available to support beamforming operations in a time interval; determine to use at least one of the one or more resources in the time interval to interact with one or more allowed classes of station (STA) to perform one or more beamforming operations; and generate a frame for wireless transmission comprising an indication of the one or more resources.

Example 2 includes the subject matter of Example 1, the frame for wireless transmission comprising an indication of the one or more allowed classes of STA.

Example 3 includes the subject matter of Example 1, the one or more resources comprising a set of frequency channels for wireless communication with STAs in the one or more allowed classes of STA.

Example 4 includes the subject matter of Example 3, the frame for wireless transmission on a primary frequency channel, the primary frequency channel absent from the set of frequency channels.

Example 5 includes the subject matter of Example 3, the indication of the one or more resources comprising a channel hop count associated with the set of frequency channels.

Example 6 includes the subject matter of Example 1, the frame comprising a responder address including a media access control (MAC) address of the AP.

Example 7 includes the subject matter of Example 1, the indication determined based on a policy, the policy comprising one or more of an ordering policy and a channel mapping policy.

Example 8 includes the subject matter of Example 1, the one or more allowed classes of STA comprising directional multi-gigabit (DMG) STAs.

Example 9 includes the subject matter of Example 8, the time interval comprising a beacon interval and the frame comprising a DMG beacon frame.

Example 10 includes the subject matter of Example 1, the AP comprising a personal basic service set (PBSS) control point (PCP).

Example 11 includes the subject matter of Example 1, the one or more beamforming operations comprising association beamforming training (A-BFT).

Example 12 includes the subject matter of Example 1, the one or more beamforming operations comprising a transmit sector sweep (TXSS).

Example 13 includes the subject matter of Example 1, the one or more allowed classes of STA comprising one or more of STAs with power control functionality, STAs with a preferred beam direction established, and STAs with out-of-band (OOB) channel-assistance.

Example 14 includes the subject matter of Example 1, the logic to determine the one or more allowed classes of STA based on a priority level associated with each of the one or more allowed classes of STA.

Example 15 includes the subject matter of Example 1, the logic to identify one or more resources unavailable in the time period, and the frame for wireless transmission comprising an indication of the one or more unavailable resources.

Example 16 includes the subject matter of Example 1, the frame for wireless transmission comprising an indication of one or more disallowed classes of STA, the one or more disallowed classes of STA excluded from beamforming operations with the AP in the time interval.

Example 17 is a system, comprising: an apparatus according to any of Examples 1 to 16; and at least one radio frequency (RF) transceiver.

Example 18 includes the subject matter of Example 17, comprising at least one processor.

Example 19 includes the subject matter of any of Examples 17 to 18, comprising at least one RF antenna.

Example 20 is an apparatus for wireless communication, comprising: a memory; and logic for a station (STA), at least a portion of the logic implemented in circuitry coupled to the memory, the logic to: identify a frame received in a wireless transmission from an access point (AP), the frame comprising an indication of one or more resources available to support beamforming operations in a time interval; and determine whether to use a resource of the one or more resources to engage in one or more beamforming operations with the AP in the time interval based on the indication.

Example 21 includes the subject matter of Example 20, the frame comprising an indication of one or more classes of STA allowed to engage in beamforming operations with the AP in the time interval.

Example 22 includes the subject matter of Example 21, the logic to: determine the one or more classes of STA allowed to engage in beamforming operations with the AP in the time interval based on the indication of one or more classes of STA allowed to participate in beamforming operations with the AP in the time interval; compare a class of the STA to the one or more classes of STA allowed to participate in beamforming operations with the AP in the time interval; determine the resource of the one or more resources available to support beamforming operations in the time interval based on the indication of one or more resources available to support beamforming operations with the AP in the time interval; and determine to use the resource of the one or more resources to engage in one or more beamforming operations with the AP in the time interval based on the comparison.

Example 23 includes the subject matter of Example 22, the resource comprising a frequency channel, and the logic to generate a frame for wireless transmission via the frequency channel.

Example 24 includes the subject matter of Example 22, the one or more allowed classes of STA comprising one or more of STAs with power control functionality, STAs with a preferred beam direction established, and STAs with out-of-band (OOB) channel-assistance.

Example 25 includes the subject matter of Example 20, the one or more resources comprising a set of frequency channels for wireless communication with the AP.

Example 26 includes the subject matter of Example 25, the frame received in the wireless transmission on a primary frequency channel, the primary frequency channel absent from the set of frequency channels.

Example 27 includes the subject matter of Example 25, the logic to determine a channel hop count associated with the set of frequency channels based on the indication.

Example 28 includes the subject matter of Example 20, the frame received in the wireless transmission comprising an indication of a media access control (MAC) address of the AP.

Example 29 includes the subject matter of Example 20, the logic to apply one or more of an ordering policy and a channel mapping policy to the indication to determine whether to use the resource of the one or more resources to engage in one or more beamforming operations with the AP in the time interval.

Example 30 includes the subject matter of Example 20, the STA comprising a directional multi-gigabit (DMG) STA and the AP comprising a personal basic service set (PBSS) control point (PCP).

Example 31 includes the subject matter of Example 30, the time interval comprising a beacon interval and the frame comprising a DMG beacon frame.

Example 32 includes the subject matter of Example 20, the one or more beamforming operations comprising association beamforming training (A-BFT).

Example 33 includes the subject matter of Example 20, the one or more beamforming operations comprising a transmit sector sweep (TXSS).

Example 34 includes the subject matter of Example 20, the frame comprising an indication of one or more resources unavailable to support beamforming operations in the time interval.

Example 35 is a system, comprising an apparatus according to any of claims 20 to 34; and at least one radio frequency (RF) transceiver.

Example 36 includes the subject matter of Example 35, comprising at least one processor.

Example 37 includes the subject matter of any of Examples 35 to 36, comprising at least one RF antenna.

Example 38 is at least one non-transitory computer-readable medium comprising a set of instructions that, in response to being executed at a wireless communication device, cause the wireless communication device to: identify one or more resources available to support beamforming operations in a time interval with an access point (AP); determine to use at least one of the one or more resources in the time interval to interact with one or more allowed classes of station (STA) to perform one or more beamforming operations; and generate a frame for wireless transmission comprising an indication of the one or more resources.

Example 39 includes the subject matter of Example 38, the frame for wireless transmission comprising an indication of the one or more allowed classes of STA.

Example 40 includes the subject matter of Example 38, the one or more resources comprising a set of frequency channels for wireless communication with STAs in the one or more allowed classes of STA.

Example 41 includes the subject matter of Example 40, the frame for wireless transmission on a primary frequency channel, the primary frequency channel absent from the set of frequency channels.

Example 42 includes the subject matter of Example 40, the indication of the one or more resources comprising a channel hop count associated with the set of frequency channels.

Example 43 includes the subject matter of Example 38, the frame comprising a responder address including a media access control (MAC) address of the AP.

Example 44 includes the subject matter of Example 38, the indication determined based on a policy, the policy comprising one or more of an ordering policy and a channel mapping policy.

Example 45 includes the subject matter of Example 38, the one or more allowed classes of STA comprising directional multi-gigabit (DMG) STAs.

Example 46 includes the subject matter of Example 45, the time interval comprising a beacon interval and the frame comprising a DMG beacon frame.

Example 47 includes the subject matter of Example claim 38, the AP comprising a personal basic service set (PBSS) control point (PCP).

Example 48 includes the subject matter of Example 38, the one or more beamforming operations comprising association beamforming training (A-BFT).

Example 49 includes the subject matter of Example 38, the one or more beamforming operations comprising a transmit sector sweep (TXSS).

Example 50 includes the subject matter of Example 38, the one or more allowed classes of STA comprising one or more of STAs with power control functionality, STAs with a preferred beam direction established, and STAs with out-of-band (OOB) channel-assistance.

Example 51 includes the subject matter of Example 38, comprising instructions that, in response to being executed at the wireless communication device, cause the wireless communication device to determine the one or more allowed classes of STA based on a priority level associated with each of the one or more allowed classes of STA.

Example 52 includes the subject matter of Example 38, comprising instructions that, in response to being executed at the wireless communication device, cause the wireless communication device to identify one or more resources unavailable in the time period, and the frame for wireless transmission comprising an indication of the one or more unavailable resources.

Example 53 includes the subject matter of Example 38, the frame for wireless transmission comprising an indication of one or more disallowed classes of STA, the one or more disallowed classes of STA excluded from beamforming operations with the AP in the time interval.

Example 54 is at least one non-transitory computer-readable medium comprising a set of instructions that, in response to being executed at a wireless communication device, cause the wireless communication device to: identify a frame received in a wireless transmission from an access point (AP) at a station (STA), the frame comprising an indication of one or more resources available to support beamforming operations in a time interval; and determine whether to use a resource of the one or more resources to engage in one or more beamforming operations with the AP in the time interval based on the indication.

Example 55 includes the subject matter of Example 54, the frame comprising an indication of one or more classes of STA allowed to engage in beamforming operations with the AP in the time interval.

Example 56 includes the subject matter of Example 55, comprising instructions that, in response to being executed at the wireless communication device, cause the wireless communication device to: determine the one or more classes of STA allowed to engage in beamforming operations with the AP in the time interval based on the indication of one or more classes of STA allowed to participate in beamforming operations with the AP in the time interval; compare a class of the STA to the one or more classes of STA allowed to participate in beamforming operations with the AP in the time interval; determine the resource of the one or more resources available to support beamforming operations in the time interval based on the indication of one or more resources available to support beamforming operations with the AP in the time interval; and determine to use the resource of the one or more resources to engage in one or more beamforming operations with the AP in the time interval based on the comparison.

Example 57 includes the subject matter of Example 56, the resource comprising a frequency channel, and the logic to generate a frame for wireless transmission via the frequency channel.

Example 58 includes the subject matter of Example 56, the one or more allowed classes of STA comprising one or more of STAs with power control functionality, STAs with a preferred beam direction established, and STAs with out-of-band (OOB) channel-assistance.

Example 59 includes the subject matter of Example 54, the one or more resources comprising a set of frequency channels for wireless communication with the AP.

Example 60 includes the subject matter of Example 59, the frame received in the wireless transmission on a primary frequency channel, the primary frequency channel absent from the set of frequency channels.

Example 61 includes the subject matter of Example 59, comprising instructions that, in response to being executed at the wireless communication device, cause the wireless communication device to determine a channel hop count associated with the set of frequency channels based on the indication.

Example 62 includes the subject matter of Example 54, the frame received in the wireless transmission comprising an indication of a media access control (MAC) address of the AP.

Example 63 includes the subject matter of Example 54, comprising instructions that, in response to being executed at the wireless communication device, cause the wireless communication device to apply one or more of an ordering policy and a channel mapping policy to the indication to determine whether to use the resource of the one or more resources to engage in one or more beamforming operations with the AP in the time interval.

Example 64 includes the subject matter of Example 54, the STA comprising a directional multi-gigabit (DMG) STA and the AP comprising a personal basic service set (PBSS) control point (PCP).

Example 65 includes the subject matter of Example 64, the time interval comprising a beacon interval and the frame comprising a DMG beacon frame.

Example 66 includes the subject matter of Example 54, the one or more beamforming operations comprising association beamforming training (A-BFT).

Example 67 includes the subject matter of Example 54, the one or more beamforming operations comprising a transmit sector sweep (TXSS).

Example 68 includes the subject matter of Example 54, the frame comprising an indication of one or more resources unavailable to support beamforming operations in the time interval.

Example 69 is a method, comprising: identifying one or more resources available to support beamforming operations in a time interval with an access point (AP); determining to use at least one of the one or more resources in the time interval to interact with one or more allowed classes of station (STA) to perform one or more beamforming operations; and generating a frame for wireless transmission comprising an indication of the one or more resources.

Example 70 includes the subject matter of Example 69, the frame for wireless transmission comprising an indication of the one or more allowed classes of STA.

Example 71 includes the subject matter of Example 69, the one or more resources comprising a set of frequency channels for wireless communication with STAs in the one or more allowed classes of STA.

Example 72 includes the subject matter of Example 71, the frame for wireless transmission on a primary frequency channel, the primary frequency channel absent from the set of frequency channels.

Example 73 includes the subject matter of Example 71, the indication of the one or more resources comprising a channel hop count associated with the set of frequency channels.

Example 74 includes the subject matter of Example 69, the frame comprising a responder address including a media access control (MAC) address of the AP.

Example 75 includes the subject matter of Example 69, the indication determined based on a policy, the policy comprising one or more of an ordering policy and a channel mapping policy.

Example 76 includes the subject matter of Example 69, the one or more allowed classes of STA comprising directional multi-gigabit (DMG) STAs.

Example 77 includes the subject matter of Example 76, the time interval comprising a beacon interval and the frame comprising a DMG beacon frame.

Example 78 includes the subject matter of Example 69, the AP comprising a personal basic service set (PBSS) control point (PCP).

Example 79 includes the subject matter of Example 69, the one or more beamforming operations comprising association beamforming training (A-BFT).

Example 80 includes the subject matter of Example 69, the one or more beamforming operations comprising a transmit sector sweep (TXSS).

Example 81 includes the subject matter of Example 69, the one or more allowed classes of STA comprising one or more of STAs with power control functionality, STAs with a preferred beam direction established, and STAs with out-of-band (OOB) channel-assistance.

Example 82 includes the subject matter of Example 69, comprising determining the one or more allowed classes of STA based on a priority level associated with each of the one or more allowed classes of STA.

Example 83 includes the subject matter of Example 69, comprising identifying one or more resources unavailable in the time period, and the frame for wireless transmission comprising an indication of the one or more unavailable resources.

Example 84 includes the subject matter of Example 69, the frame for wireless transmission comprising an indication of one or more disallowed classes of STA, the one or more disallowed classes of STA excluded from beamforming operations with the AP in the time interval.

Example 85 is a method, comprising: identifying a frame received in a wireless transmission from an access point (AP) at a station (STA), the frame comprising an indication of one or more resources available to support beamforming operations in a time interval; and determining whether to use a resource of the one or more resources to engage in one or more beamforming operations with the AP in the time interval based on the indication.

Example 86 includes the subject matter of Example 85, the frame comprising an indication of one or more classes of STA allowed to engage in beamforming operations with the AP in the time interval.

Example 87 includes the subject matter of Example 86, comprising: determining the one or more classes of STA allowed to engage in beamforming operations with the AP in the time interval based on the indication of one or more classes of STA allowed to participate in beamforming operations with the AP in the time interval; comparing a class of the STA to the one or more classes of STA allowed to participate in beamforming operations with the AP in the time interval; determining the resource of the one or more resources available to support beamforming operations in the time interval based on the indication of one or more resources available to support beamforming operations with the AP in the time interval; and determining to use the resource of the one or more resources to engage in one or more beamforming operations with the AP in the time interval based on the comparison.

Example 88 includes the subject matter of Example 87, the resource comprising a frequency channel, and the logic to generate a frame for wireless transmission via the frequency channel.

Example 89 includes the subject matter of Example 87, the one or more allowed classes of STA comprising one or more of STAs with power control functionality, STAs with a preferred beam direction established, and STAs with out-of-band (OOB) channel-assistance.

Example 90 includes the subject matter of Example 85, the one or more resources comprising a set of frequency channels for wireless communication with the AP.

Example 91 includes the subject matter of Example 90, the frame received in the wireless transmission on a primary frequency channel, the primary frequency channel absent from the set of frequency channels.

Example 92 includes the subject matter of Example 90, comprising determining a channel hop count associated with the set of frequency channels based on the indication.

Example 93 includes the subject matter of Example 85, the frame received in the wireless transmission comprising an indication of a media access control (MAC) address of the AP.

Example 94 includes the subject matter of Example 85, comprising applying one or more of an ordering policy and a channel mapping policy to the indication to determine whether to use the resource of the one or more resources to engage in one or more beamforming operations with the AP in the time interval.

Example 95 includes the subject matter of Example 85, the STA comprising a directional multi-gigabit (DMG) STA and the AP comprising a personal basic service set (PBSS) control point (PCP).

Example 96 includes the subject matter of Example 95, the time interval comprising a beacon interval and the frame comprising a DMG beacon frame.

Example 97 includes the subject matter of Example 85, the one or more beamforming operations comprising association beamforming training (A-BFT).

Example 98 includes the subject matter of Example 85, the one or more beamforming operations comprising a transmit sector sweep (TXSS).

Example 99 includes the subject matter of Example 85, the frame comprising an indication of one or more resources unavailable to support beamforming operations in the time interval.

Example 100 is an apparatus, comprising: means for identifying one or more resources available to support beamforming operations in a time interval with an access point (AP); means for determining to use at least one of the one or more resources in the time interval to interact with one or more allowed classes of station (STA) to perform one or more beamforming operations; and means for generating a frame for wireless transmission comprising an indication of the one or more resources.

Example 101 includes the subject matter of Example 100, the frame for wireless transmission comprising an indication of the one or more allowed classes of STA.

Example 102 includes the subject matter of Example 100, the one or more resources comprising a set of frequency channels for wireless communication with STAs in the one or more allowed classes of STA.

Example 103 includes the subject matter of Example 102, the frame for wireless transmission on a primary frequency channel, the primary frequency channel absent from the set of frequency channels.

Example 104 includes the subject matter of Example 102, the indication of the one or more resources comprising a channel hop count associated with the set of frequency channels.

Example 105 includes the subject matter of Example 100, the frame comprising a responder address including a media access control (MAC) address of the AP.

Example 106 includes the subject matter of Example 100, the indication determined based on a policy, the policy comprising one or more of an ordering policy and a channel mapping policy.

Example 107 includes the subject matter of Example 100, the one or more allowed classes of STA comprising directional multi-gigabit (DMG) STAs.

Example 108 includes the subject matter of Example 107, the time interval comprising a beacon interval and the frame comprising a DMG beacon frame.

Example 109 includes the subject matter of Example 100, the AP comprising a personal basic service set (PBSS) control point (PCP).

Example 110 includes the subject matter of Example 100, the one or more beamforming operations comprising association beamforming training (A-BFT).

Example 111 includes the subject matter of Example 100, the one or more beamforming operations comprising a transmit sector sweep (TXSS).

Example 112 includes the subject matter of Example 100, the one or more allowed classes of STA comprising one or more of STAs with power control functionality, STAs with a preferred beam direction established, and STAs with out-of-band (OOB) channel-assistance.

Example 113 includes the subject matter of Example 100, comprising means for determining the one or more allowed classes of STA based on a priority level associated with each of the one or more allowed classes of STA.

Example 114 includes the subject matter of Example 100, comprising means for identifying one or more resources unavailable in the time period, and the frame for wireless transmission comprising an indication of the one or more unavailable resources.

Example 115 includes the subject matter of Example 100, the frame for wireless transmission comprising an indication of one or more disallowed classes of STA, the one or more disallowed classes of STA excluded from beamforming operations with the AP in the time interval.

Example 116 is an apparatus, comprising: means for identifying a frame received in a wireless transmission from an access point (AP) at a station (STA), the frame comprising an indication of one or more resources available to support beamforming operations in a time interval; and means for determining whether to use a resource of the one or more resources to engage in one or more beamforming operations with the AP in the time interval based on the indication.

Example 117 includes the subject matter of Example 116, the frame comprising an indication of one or more classes of STA allowed to engage in beamforming operations with the AP in the time interval.

Example 118 includes the subject matter of Example 117, comprising: means for determining the one or more classes of STA allowed to engage in beamforming operations with the AP in the time interval based on the indication of one or more classes of STA allowed to participate in beamforming operations with the AP in the time interval; means for comparing a class of the STA to the one or more classes of STA allowed to participate in beamforming operations with the AP in the time interval; means for determining the resource of the one or more resources available to support beamforming operations in the time interval based on the indication of one or more resources available to support beamforming operations with the AP in the time interval; and means for determining to use the resource of the one or more resources to engage in one or more beamforming operations with the AP in the time interval based on the comparison.

Example 119 includes the subject matter of Example 118, the resource comprising a frequency channel, and the logic to generate a frame for wireless transmission via the frequency channel.

Example 120 includes the subject matter of Example 118, the one or more allowed classes of STA comprising one or more of STAs with power control functionality, STAs with a preferred beam direction established, and STAs with out-of-band (OOB) channel-assistance.

Example 121 includes the subject matter of Example 116, the one or more resources comprising a set of frequency channels for wireless communication with the AP.

Example 122 includes the subject matter of Example 121, the frame received in the wireless transmission on a primary frequency channel, the primary frequency channel absent from the set of frequency channels.

Example 123 includes the subject matter of Example 121, comprising means for determining a channel hop count associated with the set of frequency channels based on the indication.

Example 124 includes the subject matter of Example 116, the frame received in the wireless transmission comprising an indication of a media access control (MAC) address of the AP.

Example 125 includes the subject matter of Example 116, comprising means for applying one or more of an ordering policy and a channel mapping policy to the indication to determine whether to use the resource of the one or more resources to engage in one or more beamforming operations with the AP in the time interval.

Example 126 includes the subject matter of Example 116, the STA comprising a directional multi-gigabit (DMG) STA and the AP comprising a personal basic service set (PBSS) control point (PCP).

Example 127 includes the subject matter of Example 126, the time interval comprising a beacon interval and the frame comprising a DMG beacon frame.

Example 128 includes the subject matter of Example 116, the one or more beamforming operations comprising association beamforming training (A-BFT).

Example 129 includes the subject matter of Example 116, the one or more beamforming operations comprising a transmit sector sweep (TXSS).

Example 130 includes the subject matter of Example 116, the frame comprising an indication of one or more resources unavailable to support beamforming operations in the time interval.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:

a memory; and circuitry coupled to the memory to implement logic for an access point (AP), the circuitry to:

generate a frame for wireless transmission, the frame comprising a beacon interval control field, the beacon interval control field comprising a cluster control present (CC present) bit and a discovery mode bit; the beacon interval control field to indicate one or more resources available to support beamforming operations in a time interval; the CC present bit to indicate an existence of a cluster control field in a frame body of the frame; the cluster control field to indicate a first class of station (STA), of more than one classes of STA, allowed to perform one or more beamforming operations in the time interval; and cause the frame to transmit.

2. The apparatus of claim 1, the one or more resources to include resources available to a second class of STA and to include additional resources available to the first class of STA.

3. The apparatus of claim 2, the first class of STA to identify the additional resources in a portion of the beacon interval control field that the second class of STA identifies as reserved bits.

4. The apparatus of claim 2, the first class of STA to comprise one or more non-legacy stations.

5. The apparatus of claim 2, the second class of STA to comprise one or more legacy stations.

6. The apparatus of claim 1, the one or more resources to include resources available on a primary channel and resources available on a secondary channel.

7. The apparatus of claim 6, the one or more resources to include additional resources available to the first class of STA on the secondary channel.

8. The apparatus of claim 1, the cluster control field to comprise a responder address including a media access control (MAC) address of the AP.

9. The apparatus of claim 1, the more than one classes of STA comprising directional multi-gigabit (DMG) STAB.

10. The apparatus of claim 1, the time interval comprising a beacon interval and the frame comprising a DMG beacon frame.

11. The apparatus of claim 1, the AP comprising a personal basic service set (PBSS) control point (PCP).

12. The apparatus of claim 1, the one or more beamforming operations comprising association beamforming training (A-BFT).

13. The apparatus of claim 1, the one or more beamforming operations comprising a transmit sector sweep (TXSS).

14. The apparatus of claim 1, further comprising a radio interface coupled with the circuitry and antennas coupled with the radio interface.

15. At least one non-transitory computer-readable medium comprising a set of instructions that, in response to being executed by a processor, cause the processor to:

generate a frame for wireless transmission, the frame comprising a beacon interval control field, the beacon interval control field comprising a cluster control present (CC present) bit and a discovery mode bit; the beacon interval control field to indicate one or more resources available to support beamforming operations in a time interval; the CC present bit to indicate an existence of a cluster control field in a frame body of the frame; the cluster control field to indicate a first class of station (STA), of more than one classes of STA, allowed to perform one or more beamforming operations in the time interval; and cause the frame to transmit.

16. The at least one non-transitory computer-readable medium of claim 15, the one or more resources to include resources available to a second class of STA and to include additional resources available to the first class of STA.

17. The at least one non-transitory computer-readable medium of claim 16, the first class of STA to identify the additional resources in a portion of the beacon interval control field that the second class of STA identifies as reserved bits.

18. The at least one non-transitory computer-readable medium of claim 16, the first class of STA to comprise one or more non-legacy stations.

19. The at least one non-transitory computer-readable medium of claim 16, the second class of STA to comprise one or more legacy stations.

20. The at least one non-transitory computer-readable medium of claim 15, the one or more resources to include resources available on a primary channel and resources available on a secondary channel.

21. The at least one non-transitory computer-readable medium of claim 20, the one or more resources to include additional resources available to the first class of STA on the secondary channel.

22. The at least one non-transitory computer-readable medium of claim 15, the cluster control field to comprise a responder address including a media access control (MAC) address of the AP.

23. The at least one non-transitory computer-readable medium of claim 15, the more than one classes of STA comprising directional multi-gigabit (DMG) STAB.

24. The at least one non-transitory computer-readable medium of claim 15, the time interval comprising a beacon interval and the frame comprising a DMG beacon frame.

25. The at least one non-transitory computer-readable medium of claim 15, the AP comprising a personal basic service set (PBSS) control point (PCP).

26. The at least one non-transitory computer-readable medium of claim 15, the one or more beamforming operations comprising association beamforming training (A-BFT).

27. The at least one non-transitory computer-readable medium of claim 15, the one or more beamforming operations comprising a transmit sector sweep (TXSS).

28. A computer-implemented method, comprising:

generating, by circuitry, a frame for wireless transmission, the frame comprising a beacon interval control field, the beacon interval control field comprising a cluster control present (CC present) bit and a discovery mode bit; the beacon interval control field to indicate one or more resources available to support beamforming operations in a time interval; the CC present bit to indicate an existence of a cluster control field in a frame body of the frame; the cluster control field to indicate a first class of station (STA), of more than one classes of STA, allowed to perform one or more beamforming operations in the time interval; and causing, by the circuitry, the frame to transmit.

29. The computer-implemented method of claim 28, the one or more resources to include resources available to a second class of STA and to include additional resources available to the first class of STA.

30. The computer-implemented method of claim 29, the first class of STA to identify the additional resources in a portion of the beacon interval control field that the second class of STA identifies as reserved bits.

31. The computer-implemented method of claim 29, the one or more resources to include resources available on a primary channel and resources available on a secondary channel.

32. The computer-implemented method of claim 31, the one or more resources to include additional resources available to the first class of STA on the secondary channel.

* * * * *